US010983207B1

(12) United States Patent
Blanche et al.

(10) Patent No.: US 10,983,207 B1
(45) Date of Patent: Apr. 20, 2021

(54) TRANSPOSITION OF A MEASUREMENT OF A RADAR CROSS SECTION FROM AN RF-DOMAIN TO AN OPTICAL DOMAIN WITH PHASE RETRIEVAL

(71) Applicant: ARIZONA BOARD OF REGENTS ON BEHALF OF THE UNIVERSITY OF ARIZONA, Tucson, AZ (US)

(72) Inventors: Pierre Alexandre Blanche, Tucson, AZ (US); Remington Spencer Ketchum, Tucson, AZ (US); Pedro Enrique Alcaraz, Tucson, AZ (US)

(73) Assignee: ARIZONA BOARD OF REGENTS ON BEHALF OF THE UNIVERSITY OF ARIZONA, Tucson, AZ (US)

( * ) Notice: Subject to any disclaimer, the term of this patent is extended or adjusted under 35 U.S.C. 154(b) by 0 days.

(21) Appl. No.: 16/909,749

(22) Filed: Jun. 23, 2020

Related U.S. Application Data

(63) Continuation-in-part of application No. 15/973,125, filed on May 7, 2018, now Pat. No. 10,782,401.

(60) Provisional application No. 62/504,795, filed on May 11, 2017, provisional application No. 62/504,776, filed on May 11, 2017.

(51) Int. Cl.
*G01S 13/86* (2006.01)
*G01S 17/00* (2020.01)
*G01S 7/41* (2006.01)
*G01S 13/90* (2006.01)
*G01S 17/89* (2020.01)

(52) U.S. Cl.
CPC .............. *G01S 13/865* (2013.01); *G01S 7/41* (2013.01); *G01S 13/86* (2013.01); *G01S 13/9011* (2013.01); *G01S 13/9023* (2013.01); *G01S 17/006* (2013.01); *G01S 17/89* (2013.01)

(58) Field of Classification Search
CPC .... G01S 7/41–48; G01S 17/00; G01S 17/006; G01S 17/88; G01S 17/89; G01S 2007/4086; H01Q 17/00; H01Q 15/0026; H01Q 17/008
See application file for complete search history.

(56) References Cited

U.S. PATENT DOCUMENTS

| | | | | |
|---|---|---|---|---|
| 4,809,003 | A | * | 2/1989 | Dominek .............. G01R 29/105 342/1 |
| 4,990,923 | A | * | 2/1991 | Delfeld ................. G01S 7/4052 342/165 |
| 5,534,873 | A | * | 7/1996 | Weichman .............. G01S 7/411 342/165 |

(Continued)

*Primary Examiner* — Peter M Bythrow
(74) *Attorney, Agent, or Firm* — Yakov Sidorin; Quarles & Brady LLP

(57) ABSTRACT

Optical modality configured to simulate measurements of the radar cross-section of targets, dimensioned to be conventionally-measured in the RF-portion of the electromagnetic spectrum, with sub-micron accuracy. A corresponding compact optical system, with a foot-print comparable with a tabletop, employing optical interferometric time-of-flight approach to reproduce, on a substantially shorter time-scale, radar-ranging measurements ordinarily pertaining to the range of frequencies that are at least $10^3$ times lower than those employed in the conventional RF-based measurement.

19 Claims, 21 Drawing Sheets

(56) References Cited

U.S. PATENT DOCUMENTS

| | | | | |
|---|---|---|---|---|
| 5,910,787 A * | 6/1999 | Berg | ............... | H01Q 17/00 |
| | | | | 342/165 |
| 6,008,753 A * | 12/1999 | Berg | ............... | H01Q 15/14 |
| | | | | 342/165 |
| 6,252,541 B1 * | 6/2001 | James | ............... | G01S 7/4052 |
| | | | | 342/1 |
| 6,580,388 B1 * | 6/2003 | Stoyanov | ............... | G01S 7/411 |
| | | | | 342/192 |
| 6,744,400 B1 * | 6/2004 | Wei | ............... | G01S 7/411 |
| | | | | 342/165 |
| 9,151,828 B2 * | 10/2015 | Shipley | ............... | G01S 7/4052 |
| 2010/0109941 A1 * | 5/2010 | Vacus | ............... | G01S 7/41 |
| | | | | 342/179 |
| 2012/0041719 A1 * | 2/2012 | Cognault | ............... | H01Q 15/14 |
| | | | | 702/189 |
| 2014/0002297 A1 * | 1/2014 | Collins | ............... | G01S 13/003 |
| | | | | 342/175 |
| 2014/0172389 A1 * | 6/2014 | Morvan | ............... | G01S 13/006 |
| | | | | 703/2 |
| 2015/0260772 A1 * | 9/2015 | Aubin | ............... | G01R 29/10 |
| | | | | 343/703 |

\* cited by examiner

Table 1: Advantage (+) and limitation (-) of the different EM regions for radar range.

| Frequency scale | Mfg. | Source | Detector | Material |
|---|---|---|---|---|
| GHz 1-100 | (-) Too large for structures of interest | (+) Good RF sources available | (-) Limited 2D FPA detector | (+) Very good material match |
| THz 100-1,000 | (+) Many techniques available | (-) THz gap for sources | (-) THz gap for detector | (-) Properties not well studied |
| LWIR 10,000 | (+) Micron resolution | (+) Fiber and $CO_2$ lasers | (+) Excellent thermo-bolometer detectors | (-) No good low loss dielectric |
| NIR 100,000 | (-) Sub-micron resolution demanding but possible | (+) Large number of sources | (+) CCD/CMOS Si detector < 1 micron | (+) Polymer for low loss dielectric |

FIG. 1

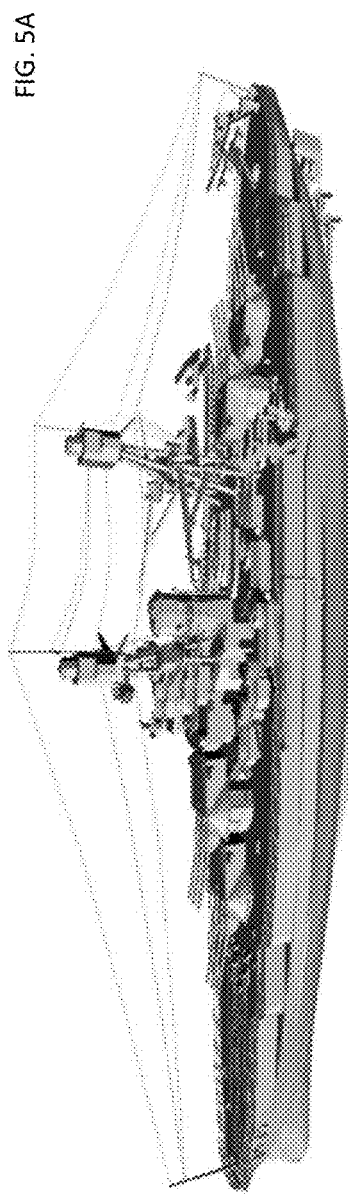
FIG. 5A
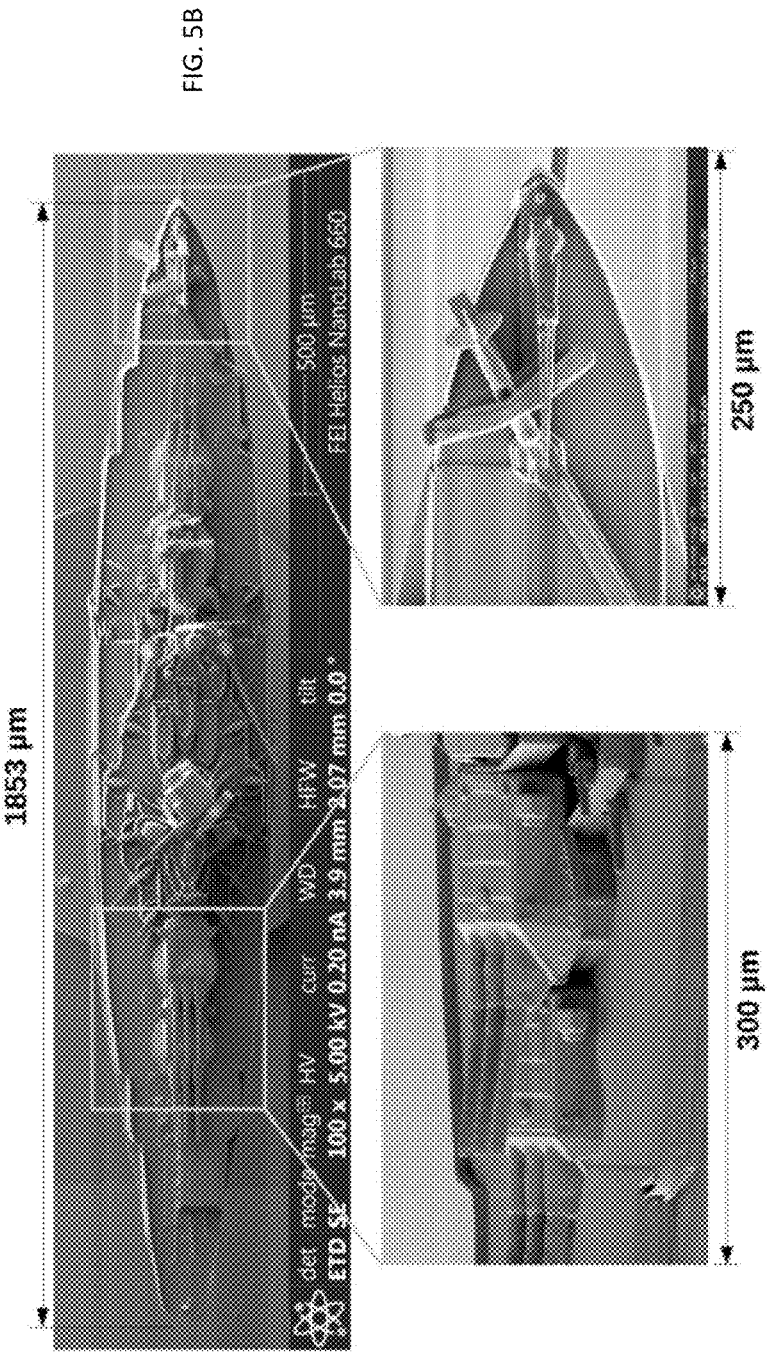
FIG. 5B
FIG. 5C
FIG. 5D

CNC micro milling
Resolution: 10 µm
Size: 1x1x1 cm$^3$
Speed: 1mm$^3$/s
Material: polymer, metal
Con: surface finish due to tool marks

Additive 3D printing
Resolution: 150 nm
Size: 300x300x300 µm$^3$
Speed: 100x50x10 µm$^3$ = 60 seconds
(galvo mirror) → 1000 µm$^3$/sec
Material: photoresist SU8, Ormocomp, IP resists
(n=1.55, low absorption)
Note: can be coated over with any metal (Al, Ag, Au), or some dielectric (SiO2).

Ion milling
Resolution: 2.5 nm
Size: beam: 0.9µm,
translation stage: 150x150x10 mm$^3$
Speed: 25 µm$^3$/sec
Material: Any conductor or semi-conductor (TBC)
Note: can be used as mold for other material (PMMA)
    Can be used in addition to 3D printing

FIG. 9

FIG. 12A
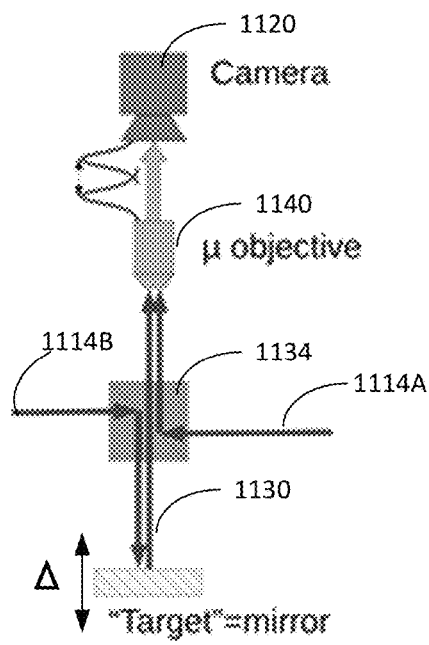
FIG. 12B
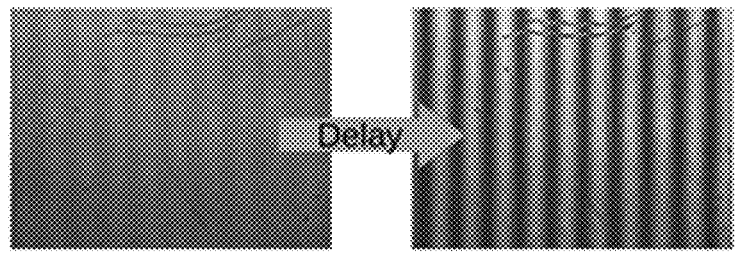
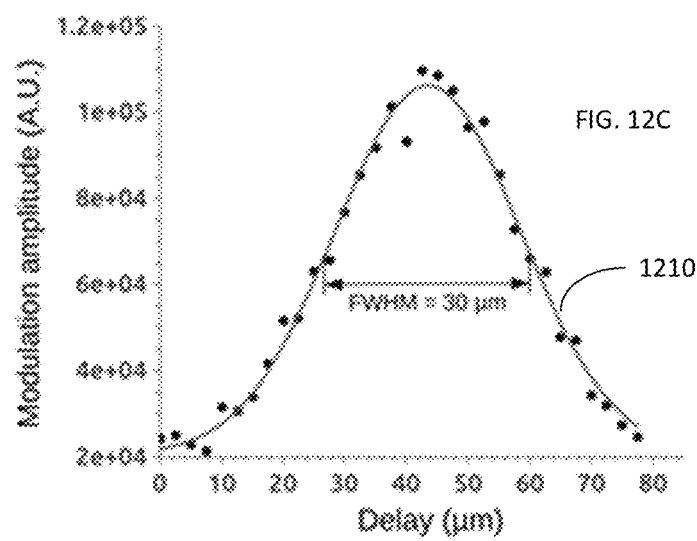
FIG. 12C
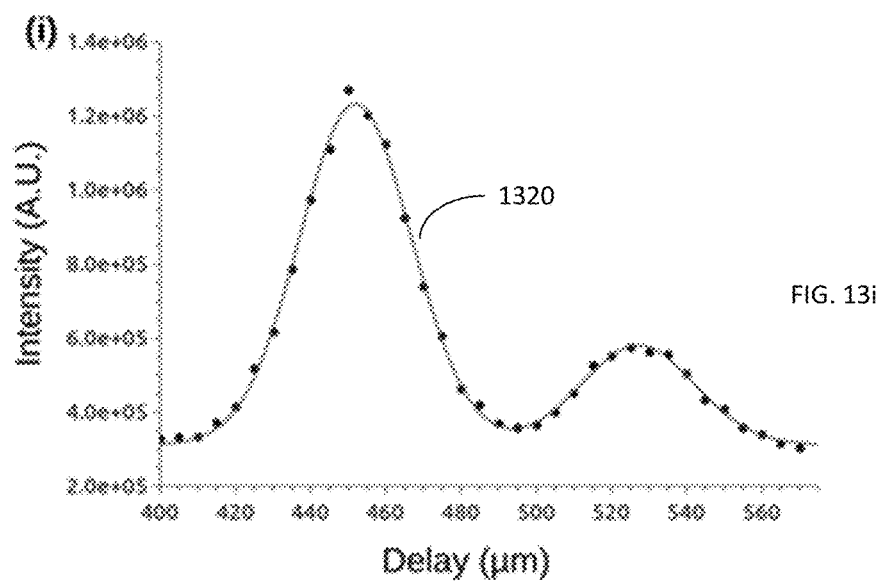
FIG. 13i

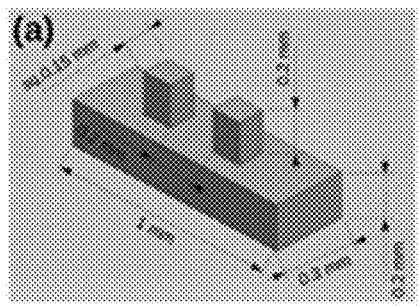
FIG. 13A
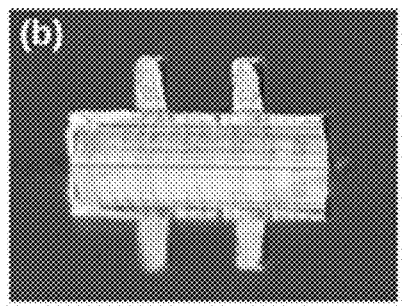
FIG. 13B
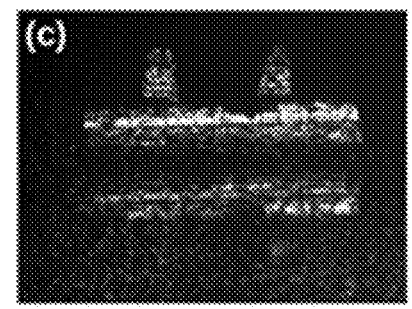
FIG. 13C
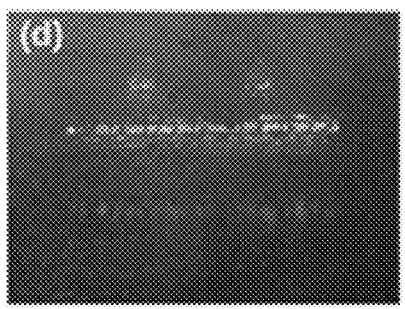
FIG. 13D
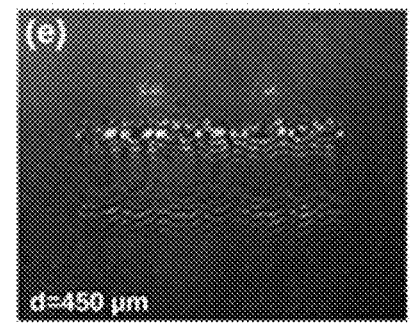
FIG. 13E
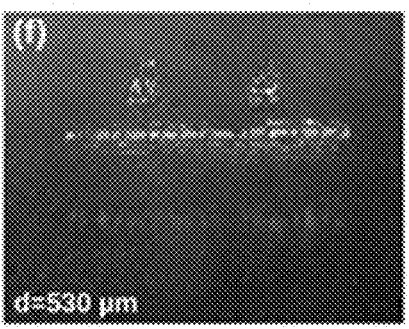
FIGF. 13F
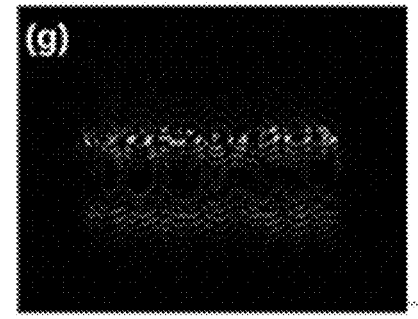
FIG. 13G
FIG. 13H

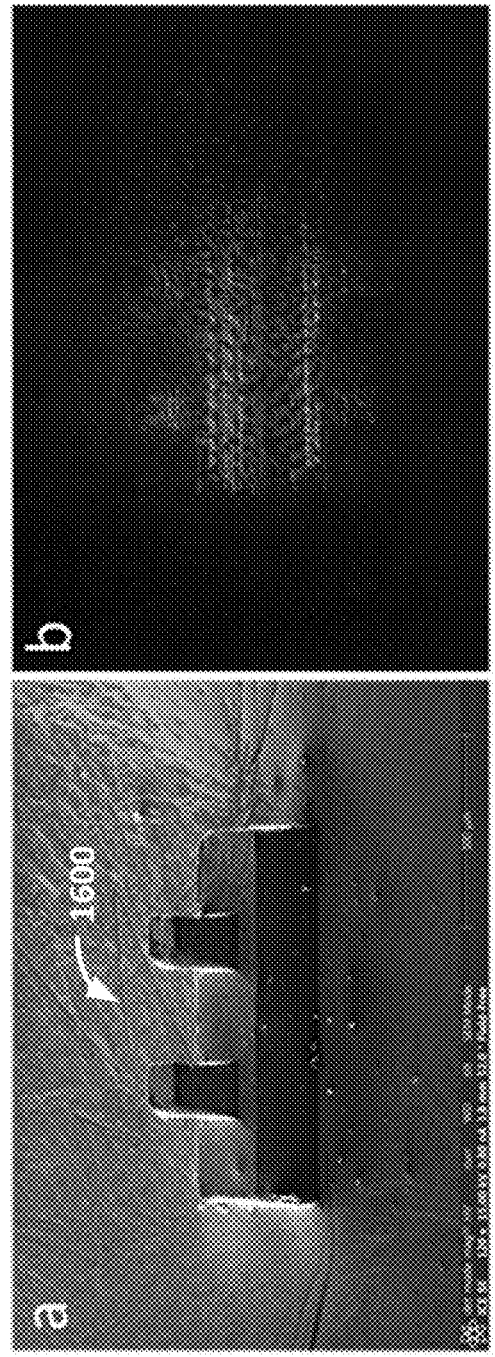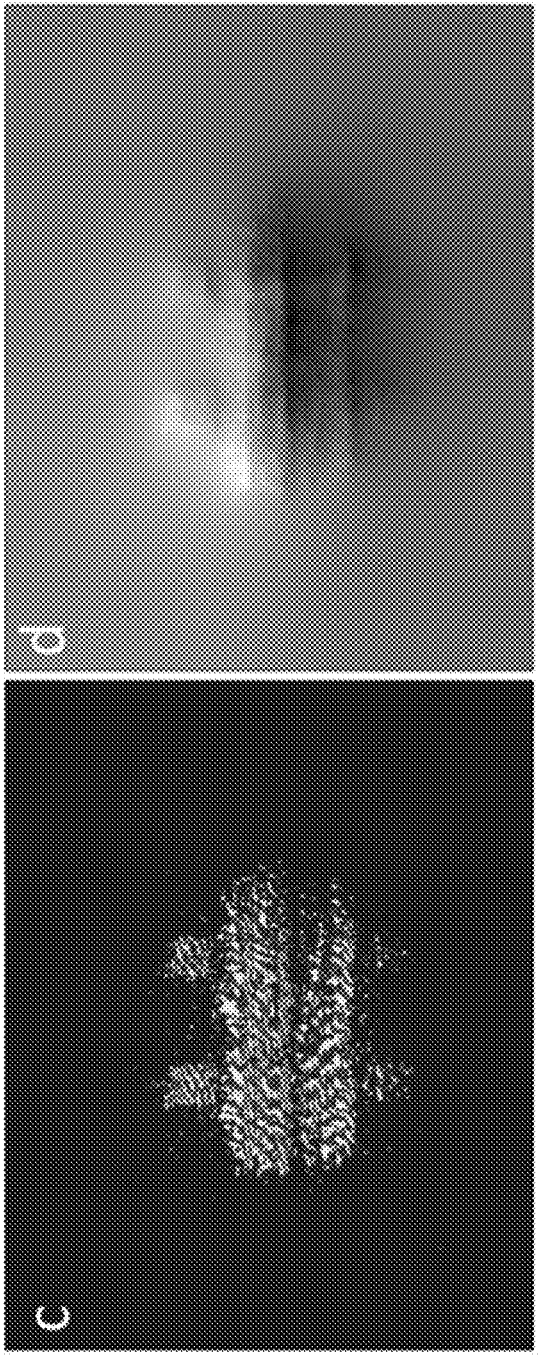
FIG. 16A
FIG. 16B (PSI)
FIG. 16C (WPM)
FIG. 16D (UPM)

TRANSPOSITION OF A MEASUREMENT OF A RADAR CROSS SECTION FROM AN RF-DOMAIN TO AN OPTICAL DOMAIN WITH PHASE RETRIEVAL

CROSS-REFERENCE TO RELATED APPLICATIONS

This patent application is a continuation-in-part from the U.S. patent application Ser. No. 15/973,125 filed on May 7, 2018 and titled "Transposition of a Measurement of a Radar Cross-Section From an RF-Domain to an Optical Domain" and now published as US 2020/0158855, which in turn claims priority from and benefit of the U.S. Provisional Patent Applications No. 62/504,776 filed on May 11, 2017, and No. 62/504,795 filed on May 11, 2017. The disclosure of each of the above-identified patent applications is incorporated herein by reference.

STATEMENT REGARDING FEDERALLY SPONSORED RESEARCH OR DEVELOPMENT

This invention was made with government support under Grant Nos. N6833519C0521 awarded by NAVY/NWC and N00014-14-1-0505 awarded by NAVY/ONR. The government has certain rights in the invention.

TECHNICAL FIELD

A radar cross-section (RCS) is typically understood to be a measure of how detectable a given object is with electromagnetic (EM) waves in a radiofrequency (RF) range (the frequency range defined to extend from about 3 kHz to about 300 GHz). A person of skill appreciates that the RCS is a measure of ability of an object to reflect radar signals in the direction of the radar receiver, it is a measure of the ratio of power emitted by the radar and scattered by the object in the direction of the radar (per a unit of solid angle, steradian) to the power that was intercepted by the object. The RCS of an object can be thought of as a comparison between the strength of the signal reflected by the object to the strength of the signal reflected by a perfectly smooth sphere having a cross-sectional area of 1 m².

A large value of the object's RCS indicates that it is easier to detect such object as compared to another object having a relatively lower value of the RCS.

Multiple factors influence the RCS of a given object/target, including: the material from which the object is made; the dimensions/size of the object; the relative size of the object in relation to the wavelength of EM waves emitted by the radar; the angle of incidence (angle at which the radar beam hits a particular portion of the object, which depends in turn upon the shape of the object and the orientation of the object with respect to the radar source); the angle of detection (angle at which the detector is located with respect to an axis connecting the source of radiation and the object); as well as the polarization of transmitted and the received radiation in respect to the orientation of the object. Considering the substantial size of some structures (such as an aircraft or a ship), performing the RCS measurements in the laboratory setting at radio-frequencies (RF) is simply impractical for some very large objects and clutter (such as sea and land, for example), as such RF-based measurements require the use of object models that have to be constructed to substantially 1:1 scale.

SUMMARY OF THE INVENTION

Embodiments of the invention provide a method for optically-measuring a property, possessed by an object at a first frequency from a radiofrequency (RF) portion of electromagnetic (EM) spectrum. The object is made from a first set of materials. The method includes a step of reproduction of the object with a scale reduction factor N from at least about $10^3$ to at most about $10^6$ from a set of second materials to fabricate a scaled-down model of the object. Here, a chosen EM property of a material from the first set has a first value at the first frequency, the same chosen EM property of a respectively-corresponding material from the second set has a second value at a second frequency, and the second frequency is equal to the first frequency multiplied by the reduction factor. In addition, the first value and the second value are approximately equal. The method further includes a step of measuring a dependence of a value of an RF radar cross-section (RCS) on a parameter representing spatial orientation of the object by acquiring scattering of radiation (which radiation irradiates the model), with an optical detector, while such radiation has the second frequency; and producing a tangible representation of topology of the object by generating at least one of a first image of a spatial distribution of a phase of the chosen radiation that has been scattered by the scaled-down model and a second image of spatial distribution of irradiance of said chosen radiation performed with the use of time-of-flight measurements.

Alternatively or in addition, the method may include a step of forming tangible representation of a dependence of a value, of a RF radar cross-section (RCS) of the object at the first frequency, on a parameter representing spatial orientation of said object by acquiring, with a radiation detector, the chosen radiation that has been scattered by said model. Alternatively or in addition, when the scaled-down model includes a plasmonic nanoantenna representing an antenna of the real object, the method may include a step of measuring at least one characteristic of operation of the nanoantenna of the object by (i) irradiating the plasmonic nanoantenna with a focused beam of radiation at the second frequency; and (ii) acquiring radiation at a third frequency emitted by the plasmonic antenna in response to such irradiating, the second and third frequencies being different from one another. The embodiment of the method may include a step of acquiring chosen radiation (that has been scattered by the model) with a second dynamic range, the second dynamic range being approximately M times larger than a first dynamic range. Here, M being a number of pixels in the radiation detector and a first dynamic range of radiation acquisition is a dynamic range with which the value of the RCS of the object at the first frequency is measured with the use of radiation at the first frequency. In one implementation, each of irradiating the model and acquiring the scattered radiation from the mode is carried out with a use of a monostatic measurement system. In a related implementation, each of so irradiating and acquiring is carried out with a use of a bistatic measurement system while adjusting a spatial angle between a first direction and a second direction (the first direction being a direction of propagation of the chosen radiation towards the model, the second direction being a direction in which a back-scattered by the model radiation propagates towards the radiation detector).

For example, one embodiment provides a method for measuring a property possessed by an object at a first frequency from a radiofrequency (RF) portion of electromagnetic (EM) spectrum (where the object is made of a first set of materials). Such method includes a step of fabricating a scaled-down model of the object from a set of second materials (and with a scale-reduction factor N in a range from about $10^3$ to about $10^6$), where the scaled-down model includes a nanoantenna representing an antenna of the object. Here, a chosen EM property of a material from the first set has a first value at the first frequency, the chosen EM property of a respectively-corresponding material from the second set has a second value at a second frequency, the second frequency is equal to the first frequency multiplied by the scale-reduction factor, and the first value and the second value are approximately equal. The method also includes steps of (i) measuring at least one characteristic of operation of the antenna of the object by irradiating the nanoantenna with a focused beam of radiation at the second frequency; and (ii) with a radiation detector, acquiring radiation at a third frequency emitted by the antenna in response to so irradiating, while the second and third frequencies are different from one another. The second frequency is not a radiofrequency and is not a frequency from a terahertz frequency range. In one case, the measuring includes collecting the radiation at the third frequency in absence of a pin-hole element disposed across a beam of the radiation at the third frequency. In one case, the radiation at the second frequency includes only radiation at a wavelength within a range from about 350 nm to about 2,500 nm. (In a specific case, the radiation at the second frequency includes only radiation at a wavelength within a range from about 350 nm to about 10,000 nm.)

Alternatively or in addition, a method may include a step of forming a spatial map of at least one of (i) an emission profile of the antenna of the object in the RF portion, (ii) gain of the antenna of the object in the RF portion, (iii) antennae interference of antennae of the object in the RF portion, and (iv) a shadow zone of the antenna of the object in the RF portion; and/or a step of generating a report containing a recommendation about at least one of repositioning and reorientation of said antenna of the object based on said spatial map. The method may further include the steps of measuring a dependence of a value of an RF radar cross-section (RCS) on a parameter representing spatial orientation of the object by irradiating the scaled-down model with the radiation at the second frequency; and acquiring the radiation at the second frequency, scattered at the model, through a pin-hole with the radiation detector. In a related embodiment, the method may also contain at least one of the steps of a) forming tangible representation of a dependence of a value, of an RF radar cross-section (RCS) of the object at the first frequency, on a parameter representing spatial orientation of the object by acquiring, with the radiation detector, the radiation at the second frequency that has been scattered by the model; b) forming a two-dimensional (2D) optical image of the model in an image plane that is optically-conjugate with the scaled-down model; and c) identifying a structural element of the object that exhibits a chosen value of the RF RCS by comparing the optical image with the dependence. The step of fabricating may include fabricating with either a micron spatial resolution or a sub-micron spatial resolution.

BRIEF DESCRIPTION OF THE DRAWINGS

The idea and scope of the invention will be more fully understood by referring to the following Detailed Description in conjunction with the not-to-scale Drawings, in which similar elements are indicated with the similar numbers and labels, and in which:

FIG. 1 presents a table summarizing advantages and limitations of performing the RCS measurements in different portions of the EM spectrum.

FIGS. 5A, 5B, 5C, and 5D illustrated SEM images of a model of the USS Arizona scaled down by a factor of about $10^5$. Images clearly attest to precise reproduction of minute structural details of the ship and appropriate spatial resolution of the 3D printed model.

FIG. 6A illustrates the RCS signal acquired with the use of the scaled-down model of the USS Arizona at 1064 nm. Images obtained at two different angles of incidence for the identification of the scatterer(s) responsible for peaks in the plot of FIG. 6A are provided in FIG. 6B (zero angle of incidence) and FIG. 6C (angle of incidence of 21 degrees).

FIG. 7A: Rendering image of the ocean model. FIG. 7B: SEM image of the manufactured ocean patch. FIG. 7C: Sea clutter RCS according to the altitude angle for radiation with vertically oriented vector of polarization. Lines are value obtained with the two different NRL sea clutter models and for different sea states. Data points represent results of the optical measurements.

FIG. 9 provides examples of manufacturing processes appropriate for fabrication of a scaled-down model of the object to implement the idea of the invention.

FIGS. 12A, 12B, 12C illustrate autocorrelation measurements performed, with the use of a 100 fs pulsed laser. FIG. 12A: Setup schematic. FIG. 12B: Optical images representing interferometric fringes registered at the camera for two different delay distances. FIG. 12C: a curve representing visibility of the interferometric fringes, acquired with the setup of FIG. 12B, as a function of the optical path delay.

FIGS. 13A, 13B, 13C, 13D, 13E, 13F, 13G, 13H, and 13i provide illustrations to the interferometric time-of-flight measurements of a chosen structure. FIG. 13A: Structure dimensions. FIG. 13B: Image of the fabricated structure of FIG. 13A. FIG. 13C: Image of the structure of FIG. 13B irradiate with coherent light emitted by the Ti:Sapphire laser source. FIG. 13D: An image corresponding to the situation when the object and reference beams are turned on (no interference). FIG. 13E: An image corresponding to the situation when the beam path difference was adjusted to maximize the interference on the "hull" portion of the structure. FIG. 13F: An image corresponding to the situation when the beam path different was adjusted to maximize the interference on the "masts" portion(s) of the structure. FIG. 13G: an illustration of the image resulting from image processing aimed at removal of the background illumination and isolation of the interference fringes on the "hull" portion of the structure. FIG. 13H: an illustration of the image resulting from image processing aimed at removal of the background illumination and isolation of the interference fringes on the "masts" portion of the structure. FIG. 13i: a plot illustrating integration over all pixels intensity(ies) as a function of the distance corresponding to the optical path delay. Dots represent the empirical results, while the line shows an interpolation with a function represented by the sum of two Gaussian functions.

FIGS. 14A, 14B: and original CAD model. FIGS. 14C, 14D: reconstruction based on the interferometric time-of-flight (ToF) images using a 2 mm long reproduction ($1/100,000$ scale) of the USS Arizona.

FIGS. 16A, 16B, 16C, and 16D illustrate an SEM of the target structure—a model substantially similar to that of FIG. 13A (FIG. 16A); an example of a single interferogram (from a set of phase-shifted interferograms acquired with the embodiment of the measurement system;

FIG. 16B); the phase of the signal returned by the target after removing low quality pixels (FIG. 16C); and the unwrapped phase (FIG. 16D). Note that the reflection of the target structure by the substrate—equivalent to reflection from sea water—gave rise to corresponding portions of the phase signal.

FIG. 17B provides an example of a single interferogram taken from the scaled-down model in the system configured according to the embodiment of FIG. 15 with 1 micron laser illumination, while

Figure 2A:
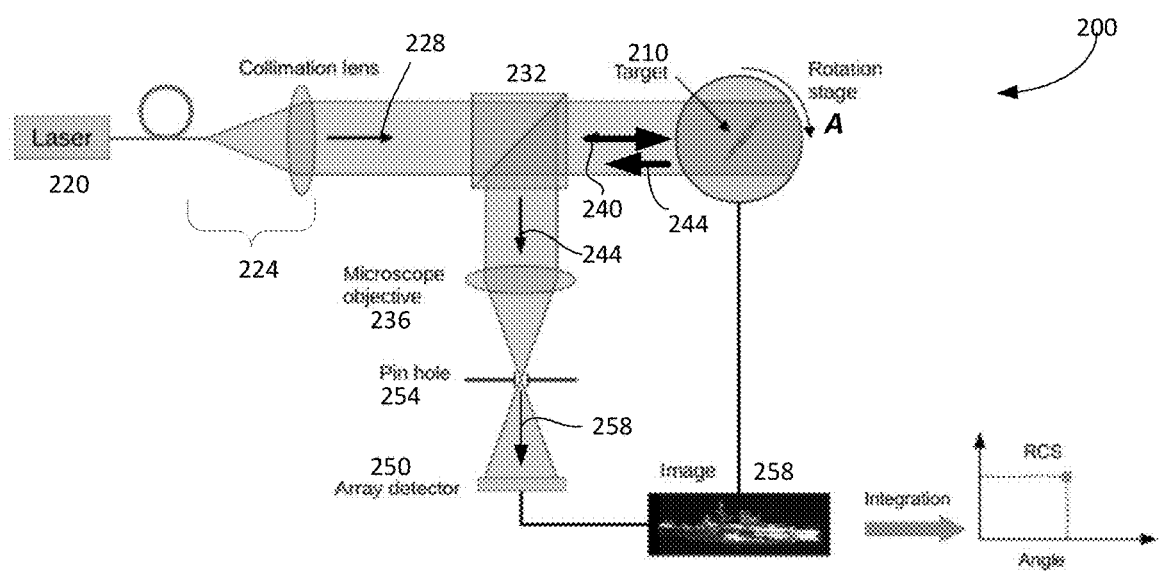
FIG. 2A illustrates a monostatic RCS-measurement setup, configured according to the idea of the invention. Values of RCS of the target corresponding to a specific angle of incidence are obtain by integrating the irradiance readings of all the pixels in the image captured at that angle.

Generally, the sizes and relative scales of elements in Drawings may be set to be different from actual ones to appropriately facilitate simplicity, clarity, and understanding of the Drawings. For the same reason, not all elements present in one Drawing may necessarily be shown in another.

DETAILED DESCRIPTION

Specific electromagnetic (EM) properties of a given subject—such as radar cross section (RCS) of an object, or antenna gain of a given transmitter—are often measured in anechoic chambers. An RCS is an intensity-based metric that describes the amount of radiation scattered from or by a target structure. Synthetic aperture radar (SAR), inverse synthetic aperture radar (ISAR), and interferometric synthetic aperture radar (InSAR) are all techniques that use moving antennae or target structures to create a synthetic aperture to generate 2D images of target structures. Typically, these images are intensity based, but radar systems are also capable of measuring the phase of returning signals. Because standard radar techniques can map the phase of scattered light, it is important to understand the phase profile of a given system and to be able to design a system with an appropriate phase profile.

For objects including very large (dimensionally speaking) structures and/or highly structurally-complex platforms, however, such conventional measurement arrangement could be not only expensive but also impractical—at least due to the sheer size of the structure being measured. The same consideration holds true for analyzing the propagation of EM waves in urban environment (the results of such analysis are required, for example, for the optimization of antenna placement for a cell phone tower). And yet, the information representing EM properties and/or environment of EM-wave propagation on a very large geometrical scale is critically needed—for example, for the implementation of the fifth generation (5G) wireless communication systems.

When designing or trying to understand a target structure's behavior in EM systems, two techniques are used to predict the radar signature: computer simulations and physical emulations. Computer simulations are gaining momentum as computing capabilities expand rapidly and numerous commercial software suites are available. Among the computational techniques used for radar simulations include finite difference time domain (FDTD), finite element method (FEM), method of moments (MoM), physical optics (PO), uniform theory of diffraction (UTD), and geometric optics (GO). Even with current computer systems, these computations can have prohibitive memory and CPU requirements as the size of the problem increases. Full-wave solutions like FDTD and FEM require large meshed simulation regions around the model resulting in high memory usage and processing time, rendering the computer-simulations-based solution intractable for geometrically-large objects (structures of interest for radar simulations are often much larger than the wavelength and can quickly become computationally too expensive to simulate). In addition, the complex computer codes can—and often do—diverge and/or experience computational artifacts that should be identified by other means, thereby further complicating the overall process of computer simulations.

Considering that Maxwell's equations of wave propagation are invariant under dilatation transformation, it is possible to make the measurement on reduced size models by using a proportionally shorter wavelength than the one employed in radar (radio detection and ranging). By conserving the scale factor and material properties between model and wavelength, the solution of the EM wave propagation is identical. Matching the EM properties of the original component requires the substitution of the materials with similar permittivity and permeability at the scaled wavelength. The advantage of the scaling approach is that it is easier to make the measurement on a smaller model than on the original object. For over 70 years, engineers have used scale models of large and/or complex radio-frequency (RF) systems to determine their EM properties. However, these models were limited to reduction factors (coefficients) of only 10 to 100 to remain in the same portion of the RF spectrum. Using such a limited scale factor, provides the benefit that material properties are usually very similar for life and scaled frequencies, and no substitution is required. However, the fabrication of large scale models is laborious, takes several weeks, and costs tens of thousands of dollars for a single model. More recently, RCS measurement with a scale factor of a few hundreds and using terahertz frequency were demonstrated. The advantage of this scale factor is that model can be fabricated by a variety of techniques such as CNC (Computer Numerical Control) mill, or additive 3D printing. Unfortunately, THz sources and detectors are not commonly accessible, and material properties in this frequency range have not yet been thoroughly measured.

The idea of the present invention stems from the realization that Maxwell's equations are invariant under dilatation transformation. (A dilatation is understood as a transformation that includes i) producing an image of an object or, more generally, a replica or model of an object that is substantially similar if not completely identical to the object itself in shape but is different in size, and ii) a corresponding scaling of a wavelength of radiation with which the replica is measured, as compared with the wavelength used for measurement of the actual object). According to implementations of the invention, the sought-after information (that is, the information representing the results of RF-based measurement(s) of an identified large and/or structurally-complex real object) is obtained with the use of a "reduced-dimensions methodology," according to which both the model of the object and the wavelength of radiation used for measurements of such a model are reduced (or scaled-down) by substantially the same coefficient or factor as compared with, respectively, a) the size of the real object and b) the conventionally-used RF radiation conventionally-used for the radar-based measurement of such real object.

In addition, in a specific implementation, the measurement(s) of the scaled-down model of the real object are carried out with the use of optical radiation (light, such as visible light, for example) and with models of objects for which the dimensions are reduced or scaled down by a factor representing the ratio between the wavelength of an RF-spectrum and that of the optical spectrum. Generally, the terms "light" and "optical" are used herein in their most general meanings as referring to an electromagnetic wave having a wavelength in the visible and/or NIR portion of the EM spectrum.

While mimicking the measurements of large-scale objects with the use of scaled-down models of such objects has been attempted before, a skilled artisan is well aware that all such attempts were made with a reduction factor of only a few tens to a few hundreds, and were never attempted outside this range.

For example, measurements carried out on the models scaled with a reduction factor of only a few tens allowed the users to utilize and keep the frequency of radiation used for the measurements in the same conventionally-exploited RF domain. (A person of skill in the art will readily appreciate that such measurements do not fall under the umbrella of the idea and/or implementation of the present invention.) On the one hand, the use of such a small scale factor on the order of 10× provides the apparent benefit that substantially the same—if not identical—materials can be used for construction of both a model of the object and the object itself (due to EM properties of both the object and the model of the object that are usually very similar for frequencies in the same RF-region). Accordingly, the measurements carried out with the reduction factor on the order of 10× or so do not require any substitution of materials for fabrication/manufacture of the model as compared to those of the object. The practical implementation of such measurements, however, continues to present an obvious problem—the laborious manufacturing of large scale models of the object somewhat comparable in size with the object itself.

The measurements that are effectuated with a scale factor of a few hundreds and with the use of radiation in a THz frequency range (defined from about 0.3 THz to about 3 THz, or with radiation at wavelengths from about 1 mm to about 0.1 mm) provide the apparent advantage in that the substantially reduced-in-size model of the real object can now be manufactured with a variety of techniques (such as CNC, or additive 3D printing, for example). These measurements, however, inevitably suffer from an unfortunate limitation/unavailability of a variety of radiation source(s) and/or detector(s) that operate in this frequency range. For example, as is well appreciated in related art, the per se imaging of the object in the THz spectral range remains practically limited and complicated due to the fact that an areal (two-dimensional, 2D) detector, required to form an image of the object at these frequencies, has very limited resolution (a typical detector boasts 320×240 pixels with a size of 50 microns each, and has sensitivity NEP of less than 30 pW at 2.5 THz). While arguably the use of synthetic apertures can be employed for image approximation, the implementation of the measurement employing such apertures necessarily requires substantial and complicated computations. Moreover, as is recognized in the art, the EM properties (such as permittivity and permeability, for example) of various materials in the THz frequency range are not yet reliably known. Consequently, the reduced-factor measurements implemented in the THz range are, at a minimum, far from being reliable even if practically possible.

Notably, by ensuring that the first scale factor (that relates the size of the model of the object to the size of the object itself) and the second scale factor (that describes the dissimilarity between the empirical-measurement wavelength and that of a conventionally-used RF-wavelength) are substantially equal—or, stated differently, that the scale factor is conserved for both the geometrical and spectral transpositions/transitions taking place during the measurement of the model of the real object—the results procured with the use of the methodology disclosed below are substantially identical to those which would be obtained with the conventional use of RF radiation and the actual, real object.

The proper practical implementation of the reduced-size methodology would require that the electromagnetic properties of materials used for construction of a reduced-size model be also conserved during the transition from the RF-frequency to a higher frequency, chosen for the measurements. Phrased differently, the mimicking of the conventional RF-based measurements of the RCS of a real-size object with those of a model of the object in the optical domain imposes a task of ensuring that the EM properties of the materials, from which the model of the object is made, are substantially the same as the EM properties of the materials from which the real object is made. To observe and/or satisfy this condition, it may require the substitution of the original media/materials with other materials that have substantially the same, if not identical, complex permittivity and/or permeability at the scaled frequency as the materials of the real object.

In stark contradistinction with measurements carried out in any other frequency region of the radiation spectrum, the implementation of the idea of the invention in the optical spectral window has not only been never attempted but does not even appear to be a subject of practical discussions—and for the reason with which a person of skill in the art would readily agree: fabrication/creation/formation/manufacturing of object models the geometrical scale of which is reduced (in comparison with the objects themselves) by a factor in the range from about $10^3$ to about $10^6$ or so is extremely challenging in practice. To this end, the technical goals and discussion presented below advocate against the conventional thinking and, quite unexpectedly, make use of advantages of (i) the availability of the 2D (areal) optical detection technology, which supports direct, immediate, real-time imaging of the model of the object (that is practically difficult in the RF-portion of the spectrum), (ii) the availability of sources of coherent and incoherent light with different characteristics (such as pulse length, spectral width) that can mimic and represent (during the optical measurement) different types of RF emissions used in the field when working with real objects, and (iii) the availability of plethora of materials, for model construction, which possess the same or substantially the same permittivity as those that the object possesses in the RF range of the spectrum. All these lead to reliable concrete results of the measurements configured as proposed herein.

The scaled/reduced size measurement methodology discussed below advantageously offers cheaper, faster, and more practically-accessible experimental environment than that employed with the actual (full-scale, small scaling factor) object in the RF/THz portion of the EM-spectrum. Moreover, as discussed below, the empirical results procured with reduced-size methodology confirm and buttress the results of related computational simulation(s).

According to the idea of the invention, the optical spectrum in general—and, in particular, a visible to near-IR range of wavelengths and corresponding frequencies—was chosen to implement a compact range for RCS measurements. In one specific embodiment, such range was identified to be from about 350 nm to about 2500 nm, in which the technology to-date provides the most diverse choices of optical sources, optical detectors, manufacturing techniques, as well as materials for fabrication of the model(s) that possess the same dielectric characteristics as the objects in the RF-portion of the spectrum. (In other embodiments, the range of wavelengths of light chosen for measurements—and a correspondingly-determined factor of scaling down the dimensions of the object for construction of a model—may extend up to about 0.1 mm and remains within the scope of the invention.)

Indeed, in the visible to NIR spectral regions there exists, due to the recent developments in photonics, plasmonics, and nano-manufacturing, a large variety of laser sources (such as femtosecond pulsed fiber laser, for example, that can be used for ranging; or super-continuum lasers that can be used for spectral analysis). When the measurement wavelength of choice is kept below about 1.1 micron, for example, silicon-based focal-plane array detectors such as CCD and CMOS are readily available with high sensitivity and small pixel pitch. To acquire radiation with wavelength(s) above 1.1 micron, detectors based on other semiconductors such as InGaAs can be used (within their respective quantum efficiency bands). Not only electromagnetic properties of various existing materials in the—visible/NIR regions are very well defined, but organic chemistry and the use of nanoparticles can be exploited to obtain new, synthetic materials with good transparency and tunable refractive index(ces) to reproduce the permittivity values observed in the RF-region. Moreover, the field of plasmonics offers the opportunity to design nano-antennae to be affixed or otherwise associated with the scaled-down model of the actual object to monitor antenna gain and interference.

As was already alluded to, a skilled artisan would readily appreciate that, when a specific case of a scale-down factor on the order of 100,000 . . . 1000,000 and a change of operational wavelength/frequency from about a center of the S-band (~3 GHz) to about 1 micron (~300 THz) or shorter is considered, the accurate manufacturing of a model of the real-size object appears quite challenging, which may be precisely the reason that has prevented a skilled artisan to-date from exploring a possibility of utilizing such new spectral range for carrying out the RCS measurements. During the implementations of the present invention, such well-recognized limitation was overcome by implementing multiphoton additive manufacturing with sub-micron resolution, the use of lithography as well as focused ion beam—either individually or in combination—to accurately reproduce all required features of the complex-shaped object in the scaled-down model. Other wavebands of interest including C, X, Ku, K, and Ka bands can also be simulated by scaling the size of the model by the corresponding relevant ratio.

This disclosure provides specific examples of implementations of the idea of invention with the scaling factor of about $10^5$ to $10^6$ for the sake of simplicity of discussion. It does not limit and is not intended to limit the scope of the invention with respect to differently-valued scaling factors, however. For example, another frequency range of potential interest for scaled-down measurements of the large and/or complex-shaped objects may be a "thermal" range, or long wave-length IR, or LWIR, range. If used, the LWIR wavelength range centered around 10 microns would require a scale factor of about 10,000, which relaxes the tolerance on the model manufacturing as compared to the NIR and/or visible ranges. Reliable laser sources are available in the LWIR range, as well as high density thermal bolometer detectors. Notably, however, the dielectric materials that are transparent in such wavelength region are not common, and as of date only some of the chalcogenide crystals—such as germanium, for example—have the suitable EM characteristics. In addition, as recognized in the art, chalcogenide crystals are not readily compatible with many manufacturing processes, especially 3D printing, which make them practically unsuitable for scaled-down model fabrication.

Summary of the advantages and limitations of implementing the idea of the invention in different EM regions, described in some detail above, is presented in Table 1 of FIG. 1. The data corresponding to the visible portion of the optical spectrum are not expressly shown.

Figure 2B:
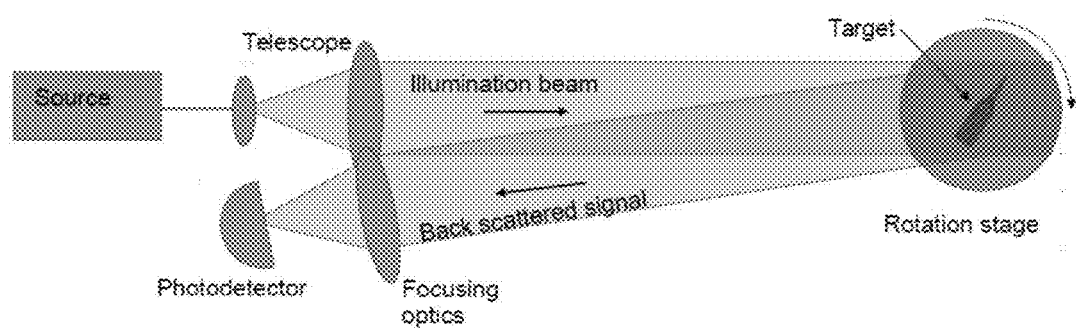
FIG. 2B provides a bistatic RCS measurement setup, in which the angle between the first direction of propagation of the beam illuminating the target and the second direction of propagation of the back scattered signal can be adjusted (and in which generally illuminating beam and the back-scattered signal are not propagating collinearly).

In one implementation, in order to carry out the measurements of the RCS of an object in the optical portion of the EM spectrum according to the idea of the invention, the experimental setup 200, schematically shown in FIGS. 2A, 2B, was used. The setup of FIG. 2A represents the measurement configuration referred to as a monostatic configuration, in which the target (the scaled-down model of the object) 210 is irradiated along the same direction along which the useful signal is observed (in other words, the axis along which the target is irradiated and the axis along which the useful signal propagates towards the detector are collinear). In this specific implementation, a continuous wave (CW) 1064 nm single-frequency, narrow-linewidth (<5 kHz FWHM bandwidth) fiber laser module with 100 mW of output power was used as the laser source 220. The laser output was linearly polarized with an extinction ratio larger than 20 dB. The output end of the single-mode fiber (SMF) was optically cooperated with a fiber collimator module 224 to form an output beam with a diameter of about 3.4 mm. The light output 228 was then directed towards the target 210 through a 50/50 non-polarizing beam splitter 232 (positioned to optically separate the source 220 from the collecting optics 236) to form beam 240. The automated rotation stage supported the target 210 to facilitate the alignment of the target 210 with respect to the impinging thereon interrogating beam of light 240. The set-up was additionally equipped with the collecting optics (in one implementation—a lens system) 236 and means for utilizing 5 degrees of freedom of spatial repositioning (3 lateral degrees of freedom, and 2 angular degrees of freedom), not shown. In a specific implementation, the back-scattered from the target 210 light 244 (the useful signal, or signal, for short) was collected with a long-working-distance microscope objective 236 (magnification of which was chosen in the range from about 100× to about 4λ, depending on particular dimensions of the target 210).

In a practical, field-radar-based configuration of the RCS-related measurement, a single RF detector would normally be placed at the focal plane of the signal-collecting RF system. In the case of the implementation of the present invention, however, instead of using a single cell photo-detector (the most commonly type used for the measurements in the RF portion of EM spectrum), a 2D optical array (multi-cell) detector 250 was placed at the image plane of the microscope objective 236. (As was already alluded to above, the use of a 2D (areal) detector in the RF-based measurements is known to be not satisfactory for the purposes of such conventional measurements.) The rejection of light propagating off-axis (the off-axis signal)—which normally would not be collected by a single-cell photodetector used during the RF-based measurements of an actual object—is required in the present case of optical measurements. Such requirement was addressed with the use of a 2 mm aperture 254 at the focal plane of the collecting optics 236. The measurement configuration 200 is similar to that of a confocal microscope. The value of the RCS corresponding to a specific angle of incidence A of interrogating light 240 on the target 210 was obtained by integrating the distribution of intensity of light 258 (that has passed through the aperture 254) across all the pixels of the detector 250 that acquired the image 260, of the target 210, captured at such angle A. While not expressly shown, the operation of the system 200 (both in terms of operation of the components of the system and collection and/or processing of empirical data) can be governed with a controller equipped with a programmable electronic circuitry (processor).

The data-acquisition approach and system configured according to the idea of the invention resulted in several practical advantages. First, the optical, 2D image 260 of the target 210 was formed in real time and then used, again in real time, to determine the location of light-scatterers responsible for the RCS signal, determined as a total intensity signal summed over the pixels of the optical detector (see FIG. 5 discussed below). It is well known in the art of RF-based acquisition of the RCS that the formation or creation of a 2D image of the actual object in the RF spectral region is not possible in real time, as was already discussed above. For the purposes of this disclosure and accompanying claims, the term "real time" or related terms are used to refer to a real-time performance of a system, which is understood as performance that is subject to operational deadlines from a given event to a system's response to that event. For example, a real-time extraction of data (such as irradiance or phase data) from radiation acquired with a chosen radiation detector may be one triggered and/or executed simultaneously with and without interruption of an image acquisition procedure. In a specific case, real-time performance includes a data-processing delay that is comparable in duration with the time of acquisition of a single acquisition frame.

Second, since the set-up 200 was configured to spatially distribute the sought-after light signal 258 over the surface of the array detector 250, the overall dynamic range of the proposed system and method of measurement was advantageously increased (in comparison with that utilizing a single-pixel/single-cell detector during the measurements carried out in the RF spectral region) by a coefficient representing the number of pixels subtended by the optical image field. (In other words, if a first dynamic range of radiation acquisition is a dynamic range with which the value of the RCS of the object is measured with the use of RF-radiation, then the acquisition of the optical back-scattered by the model radiation in the proposed measurements is characterized by the second dynamic range that is approximately M times larger than the first dynamic range, with M being a number of pixels in the used optical radiation detector.)

While noting that there are general similarities between the target-related information obtained with the optical measurement as described above and that determined by the inverse synthetic aperture radar (ISAR) technique (in that both provide 2D imaging data), a person of ordinary skill in the art would not dispute that—in stark contradistinction with the computations necessitated by the use of the ISAR methodology—the optical-range-based method of the invention, irrefutably, does not require back-projection computations.

Notably, the use of the proposed optical-range methodology facilitates and allows for the determination of the actual, absolute distance between the source of radiation and the target as long as the CW laser source is substituted, in a related embodiment, with a pulsed source (such as, for example, a femtosecond pulsed laser) while using a time-gated optical detector or a time-of-fight interferometric technique, for instance.

Example 1

The validation of the experimental results procured with the use of the measurement setup 200 was carried out by comparing these experimental results with the results assessed/computed with the use of an EM wave propagation software (ANSYS).

Figure 3:
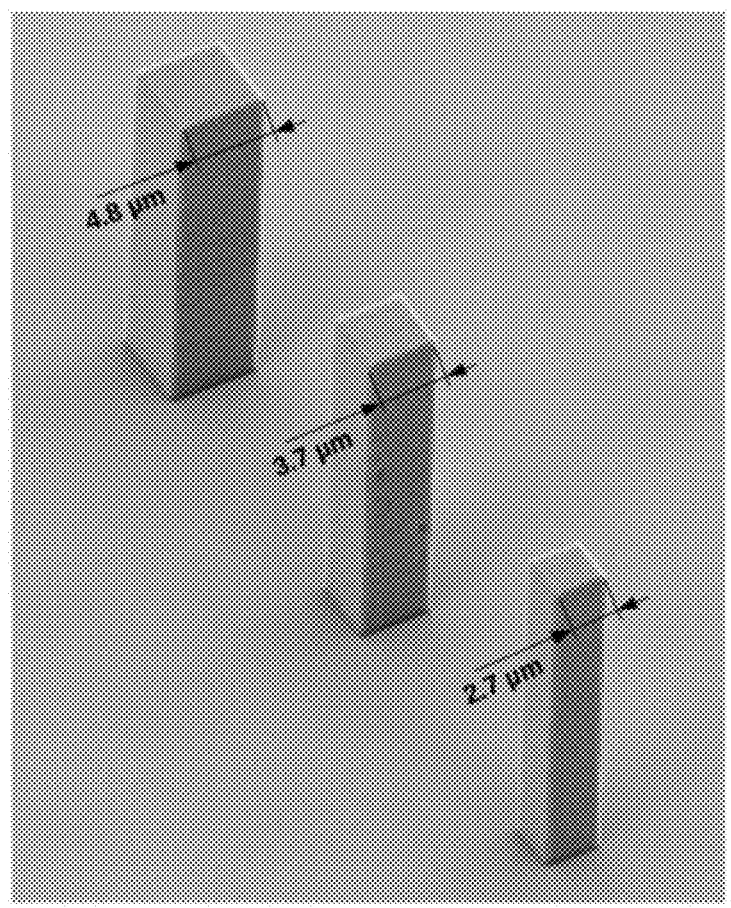
FIG. 3 is an SEM image of three micropillars having different dimensions and cross-sections.

For the software to give an accurately-computed solution, a simple target shape was chosen to ensure that the simulation results presented no ambiguity. The size/dimension and the structure of the target 210 were also chosen such that the target had distinctive scattering features. These goals were achieved by operating within the resonant (Mie) scattering region, usually defined as 1-to-10 times the used wavelength. In a specific case, micro-pillars (30 micrometers tall) were used as a target 210, with corresponding square cross-sections of 2.8 microns, 3.8 microns, and 4.7 microns. The target samples were manufactured with a Photonic Professional GT 3D printer (Nanoscribe GmbH), using the highest available resolution (of about 150 nm). The cross-sectional dimensions of the pillars were measured with an electron microscope; the images of the pillars are shown in FIG. 3. In practice, the pillars were coated with an approximately 50 nm thick layer of gold to improve reflectivity at 1 micron wavelength of operation of the laser source 220.

Figure 4A:
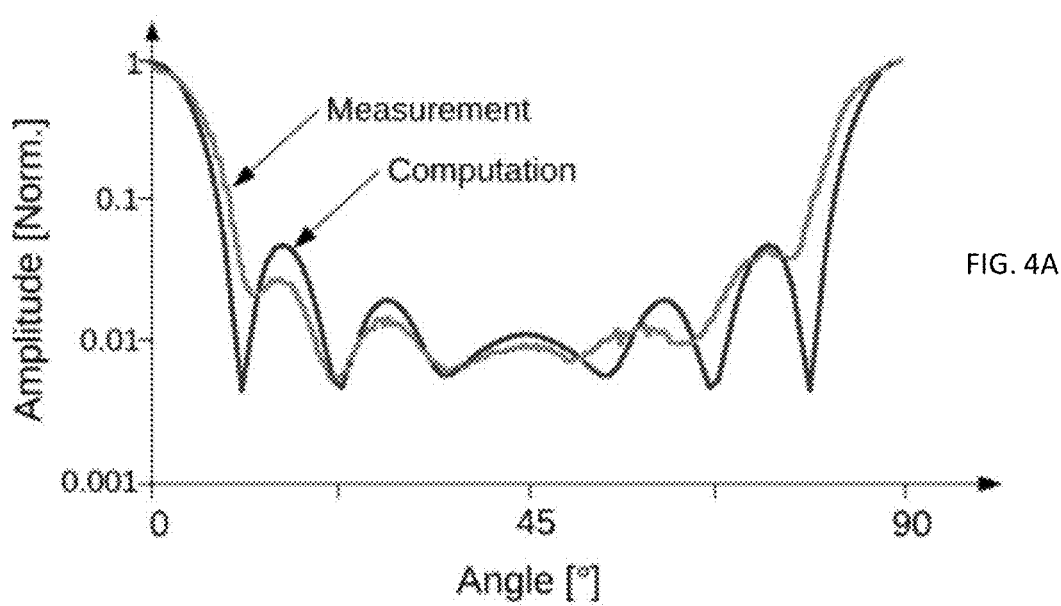
FIGS. 4A, 4B, and 4C include plots illustrating comparison between the results of the RCS measurement performed with an embodiment of the invention and those obtained computationally with ANSYS, for the three micropillars of FIG. 3. Micropillar cross-sections: 2.8 microns (FIG. 4A); 3.8 microns (FIG. 4B); and 4.7 microns (FIG. 4C).
Figure 4B:
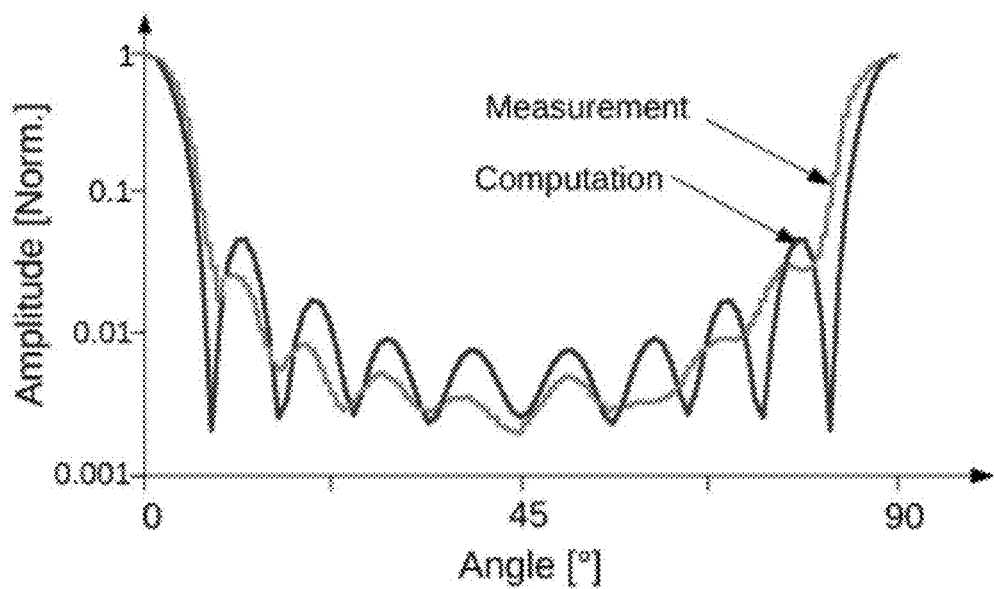
Figure 4C:
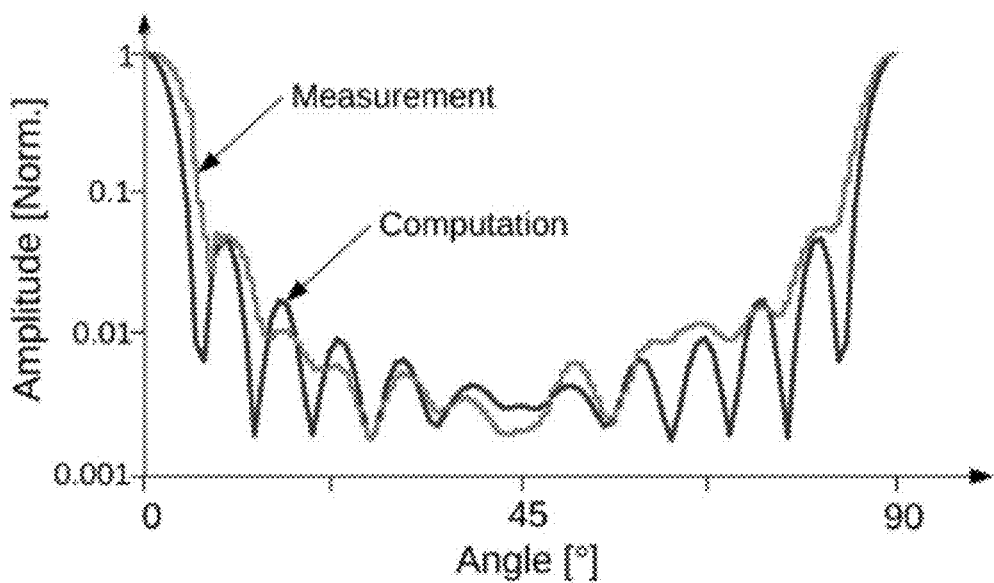

The ANSYS simulations were performed with the use of a perfect electrical conductor (PEC) material. Due to the geometry of the pillars, the RCS characteristic has a mirror-symmetry every 45 degrees. FIGS. 4A, 4B, 4C provide comparisons between the results of simulation and experimental results. The amplitude of the measured signal has been normalized and scaled to fit the results of computation.

Empirical results indicate oscillations with a period that reproduces (is substantially the same as) the period of the RCS signal oscillations evident in the curves representing the computational results. The lack of resolution of the full-depth of the signal modulation in the empirical data was attributed to the instrument impulse response function.

As a skilled artisan will readily appreciate, the impulse response characteristic of the experimental setup is mainly limited and/or defined by the diameter of the pinhole 254 located at the focal plane of the collection optics 236. A large diameter pinhole (in excess of about 3 mm) registrably transmits some off-axis propagating light towards the detector 250, which broadens the RCS peaks. On the other hand, a pin-hole with too small a diameter (of about 0.5 mm) reduces the amplitude of the sought-after signal 258. The best resolution of the RCS measurement (which is, understandably, different from the spatial resolution associated with the optical imaging of the target 210) was empirically obtained with a pin-hole having a diameter within the range from about 0.5 mm to about 3 mm.

Example 2

In a related embodiment, the same methodology was applied to more spatially-complex objects. In particular, in another example a replica (target) of the battle ship USS Arizona (BB-39), scaled-down with a coefficient of approximately 100,000, was manufactured based on the publicly-available 3D CAD data of the ship, and the measurement of this target's RCS was then performed in the optical domain. (The Nanoscribe 3D printer was used to fabricate the entire model in only 3 hours. SEM images of the 3D-printed model are shown in FIGS. 5A, 5B, 5C, and 5D and, as can be easily recognized, illustrate all minute and structurally-complex details of the ship reproduced in the model. The surface of the model was coated with gold to enhance its reflectivity in the NIR for the purpose of the measurement and to reproduce the high value of reflectivity demonstrated by steel (material mainly used for manufacture of the ship) in the radiofrequency domain.) The RCS of the model of FIGS. 5A through 5D, determined with the use of the measurement setup of FIG. 2A, is presented in FIG. 6A as a function of angle A (the angle of incidence of the interrogating light 240 onto the model of the ship).

A skilled artisan would readily appreciate that the identification of specific scatterers or portions of the irradiated target, responsible for an RCS signal, is a complicated task—at least as far as the measurements conducted in the RF portion of the spectrum are concerned. In the case of the implementation of the idea of the present invention, however, such identification is caused/rendered to be substantially easier. The advantageous practical simplification of the task of identification is based, for example, on the analysis of an optical image of the target, formed for/at a specific angle of incidence of the interrogating light. This is readily evidenced by the direct comparison between the RCS signal and optical images of the target acquired at various angles of incidence, as a skilled artisan will readily appreciate. To this end, each of FIGS. 6B and 6C illustrates images of the target 210 (scaled-down model of the actual USS Arizona ship) obtained in different spectral regions (in the IR with a coherent source of light, and in the visible with an extended incoherent source of light) in comparison with the image-representation of the CAD model of the ship. Such visual comparison is provided for angles A, of incidence of the irradiating beam 240 of zero degrees and 21 degrees, respectively in FIGS. 6B and 6C.

Figure 6A:
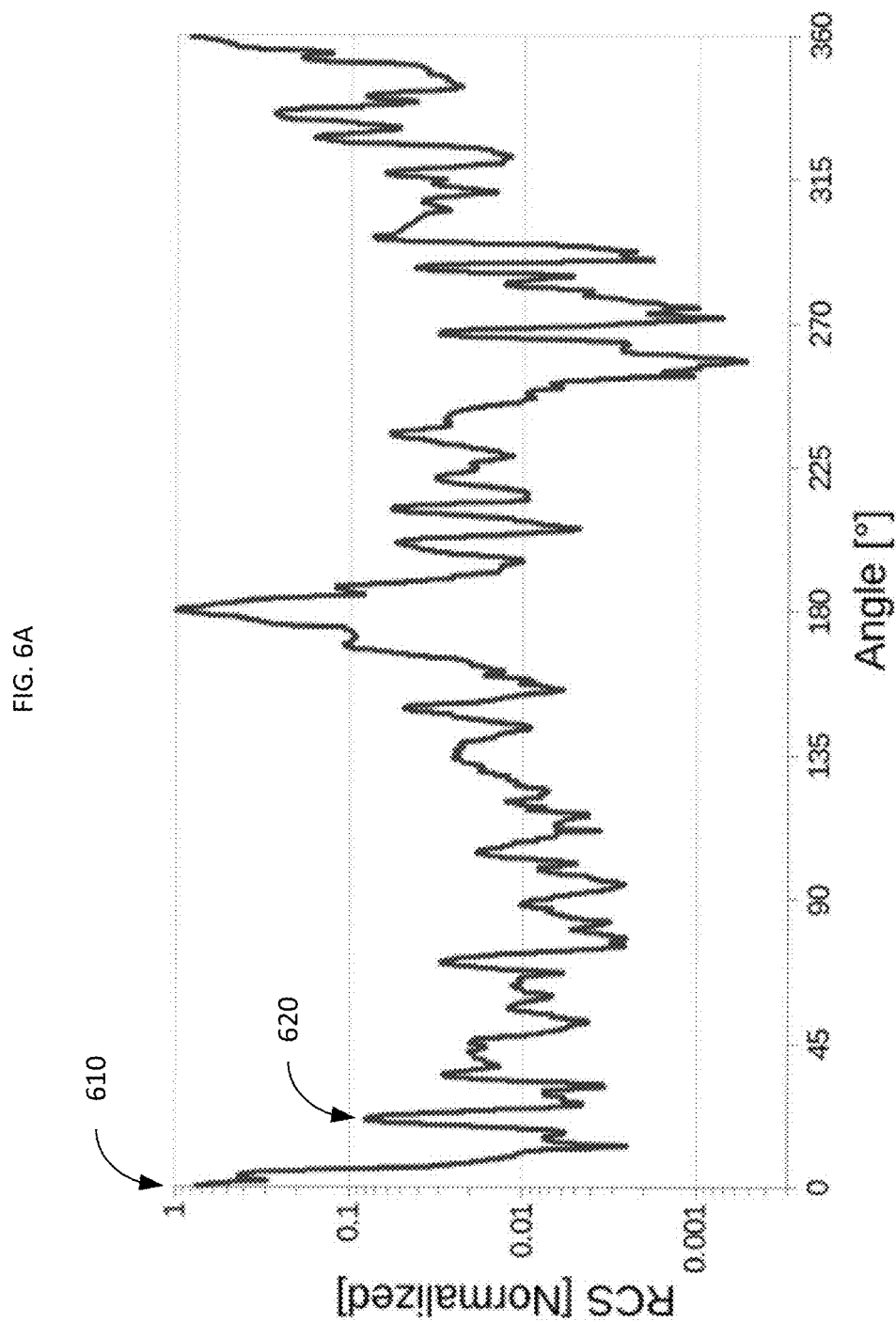
FIGS. 6A, 6B, 6C summarize the results of an optical measurement.
Figure 6B:
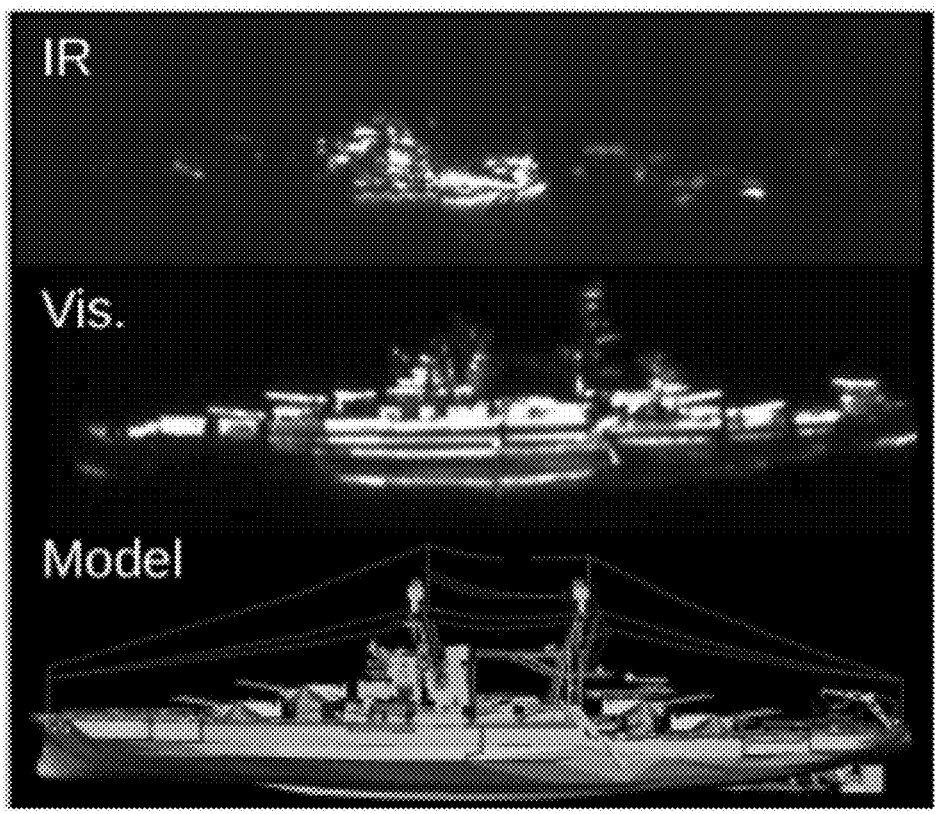
Figure 6C:
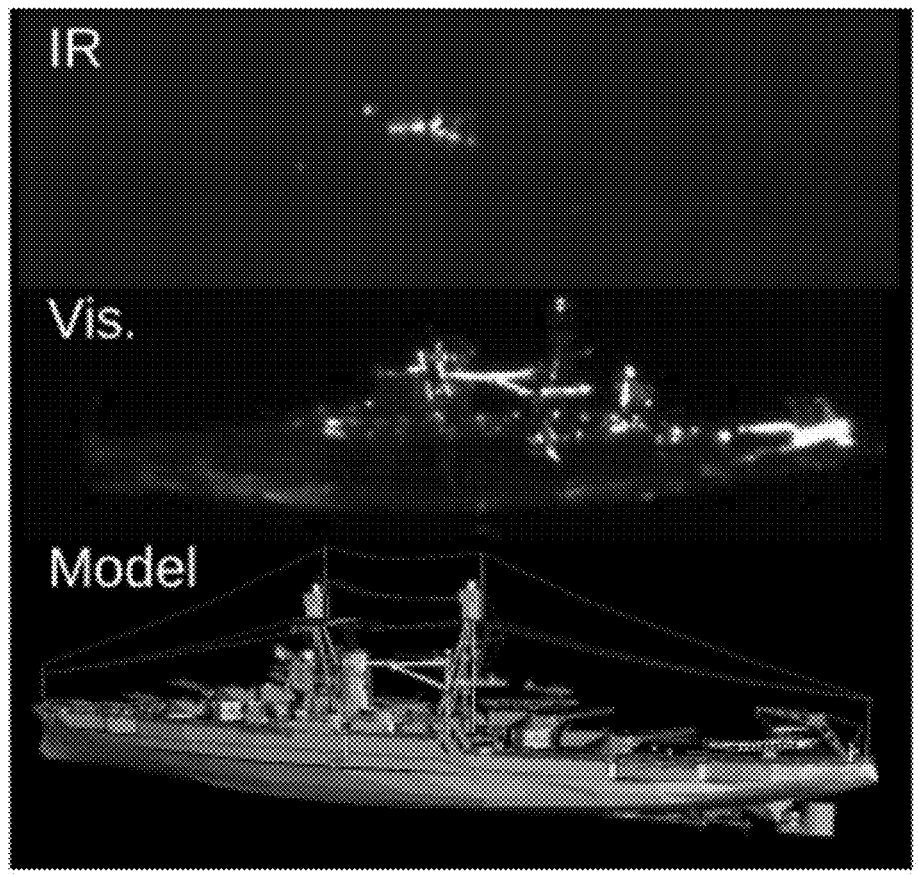

As a result of visual analysis and comparison of the RCS signal (plot of FIG. 6A) and image(s) of the target (FIGS. 6B, 6C), it was easily established that the peak 610 of plot of FIG. 6A (at A of zero degrees), which is due to reflection of light 240 from the hull of the ship model, was associated with images of FIG. 6B, while the moderate-strength peak 620 corresponding to the angle of incidence A of about 21 degrees represents (corresponds to) a crane located midship, port-side.

Example 3

Another application, in which a compact model range (configured, according to the idea of the invention, for operation in the optical portion of frequency spectrum) can provide significant operational advantages in comparison with any other methodology of related art, is the measurement of the RCS in noisy, cluttered environment (such as sea clutter, for example). A person of skill will immediately recognize that sea clutter is especially difficult to reproduce with the use of a conventionally-used RF-range measurement due to the fact that the size of the "patch" or spatial increment of the sea or ocean considered at RF has to be statistically significant and, therefore, very large (on the order of a thousand of meters squared, which makes the RF measurement substantially impractical). The dimensions of the ocean patch required to satisfy the statistical significance requirement when the embodiment of the invention is used, on the other hand (that is, in the case of a scale factor on the order of 100,000) measures only about $0.5 \times 0.5$ cm$^2$, which makes the model of the object easily reproducible with, for example, the same 3D printing technology.

Figure 7B:
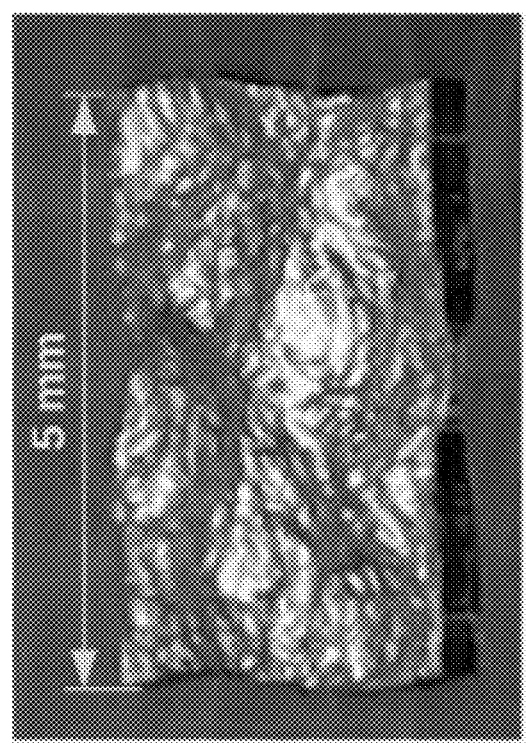
FIGS. 7A, 7B, 7C illustrate RCS for sea clutter.
Figure 7A:
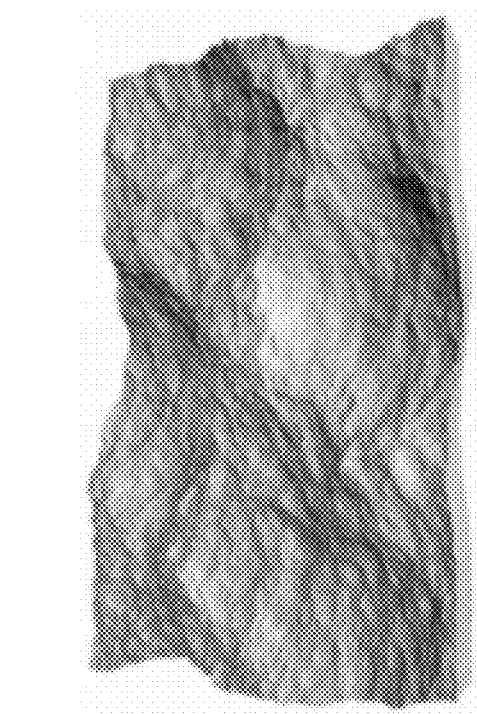

To this end, in one experiment, the model of see clutter (target) was generated using the ocean modifier in the open to the public 3D creation software Blender. (This ocean modifier is a port from the open source Houdini Ocean Toolkit and has options for a variety of parameters.) Image of the target is presented in FIG. 7A. A picture of the actually-manufactured ocean patch is shown in FIG. 7B. The target of FIG. 7B was coated with 50 nm layer of gold to reproduce the sea-water reflectivity of the S-band light.

Figure 7C:
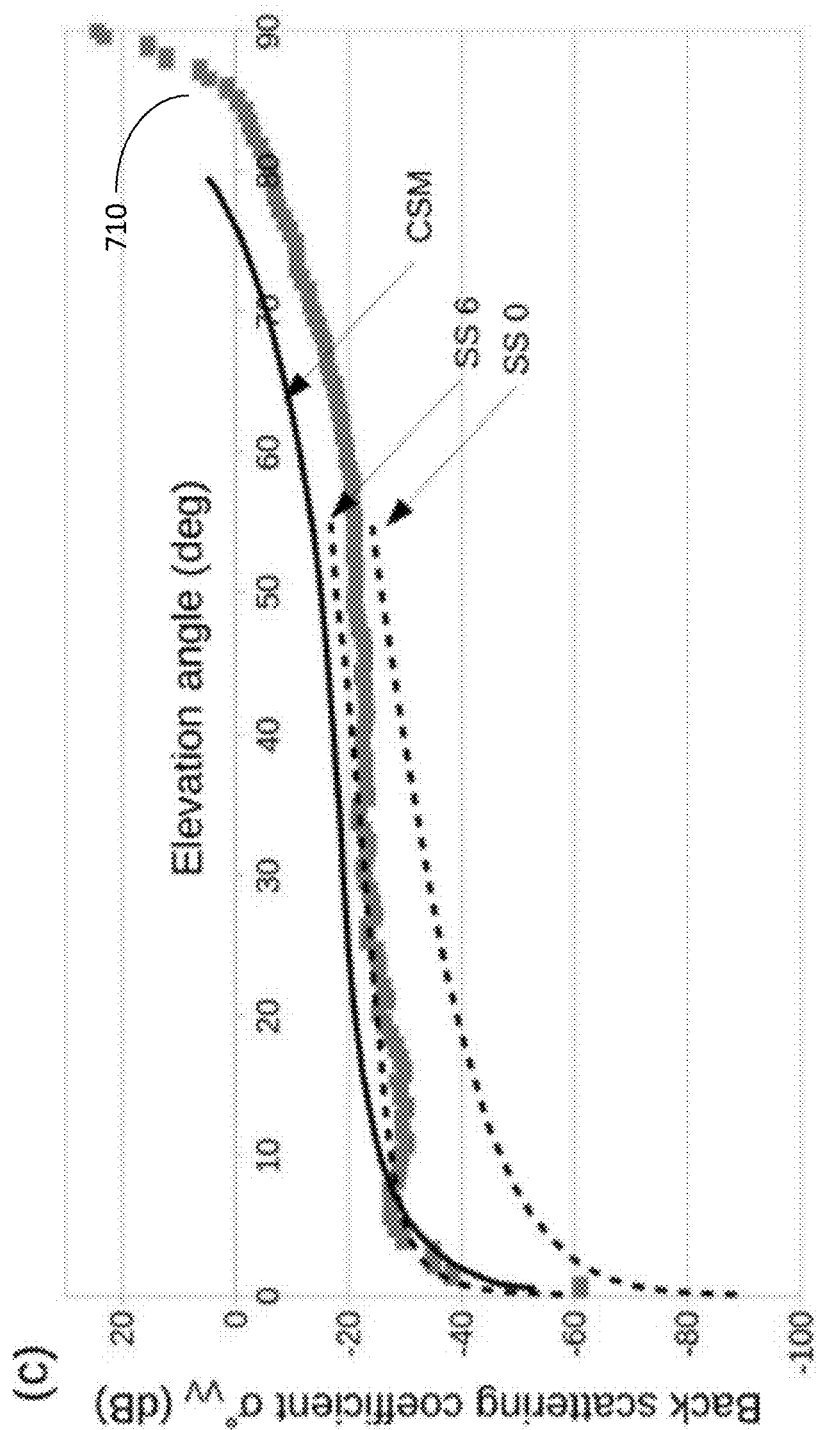

Plots of FIG. 7C illustrate the comparison and apparent agreement between the results of the RCS measurements on the scaled-down model of FIG. 7B with those computed from two NRL sea clutter models. For measurement and models, radiation with vertical orientation of the polarization vector was used. The solid line illustrates the prediction from the composite surface model (CSM) at 4~GHz from Guinard, N. & Daley, J. ("An experimental study of a sea clutter model", Proceedings of the IEEE 58, 543-550, 1970), while the doted lines were generated at 3 GHz for sea state of 0 (lower line, SS 0) to 6 (higher line, SS 6) from Gregers-Hansen, V. & Mital, R. ("An improved empirical model for radar sea clutter reflectivity", IEEE Transactions on Aerospace and Electronic Systems 48, 3512-3524, 2012). The empirical data are represented with squares (curve 710). One will readily recognize that the drop in (reduction of) intensity at a very low elevation angles and the rise at angles near the normal incidence of light are well reproduced as compared to the, and so is the slope observed in between the extreme angular values.

A skilled artisan will appreciate, therefore, that the proposed and implemented methodology of carrying out the RCS measurements in the optical portion of the spectrum (and with the use of a model of an actual object that has been not only scaled down, in size, by a coefficient in the range from about $10^3$ to about $10^6$, but the EM properties of which in the wavelength of interrogating light are substantially identical to those of the actual object at the conventionally-used for this purpose radio-frequencies) offers clear practical advantages over the conventionally-used RF-based measurements—or, alternatively, over the measurements in the THz regime. In particular, the advantages stem from the fact in that the measurement results are obtained with the of a more manageable (reduced-in-size) target, with easily-accessible source of interrogating radiation and 2D detectors (that are not useful in the THz region of the spectrum), while, at the same time, employing a plethora of materials readily available for cheap construction of the scaled-down structurally-complex models with EM properties resembling or substantially identical to those of the actual object in the RF spectral region. The use of NIR interrogating wavelengths, for example, allows the employ of high-transmission polymeric materials for reproduction of the permittivity of most dielectrics at GHz frequency. These advantages prove to be critical for reproduction of models of rock and concrete, which are important for measurements conducted in urban environment. The practical implementation of the proposed methodology is also incomparably quicker (takes less time) as compared to the time required for RF-based computation (especially, for structurally-complex objects).

Example 4

Notably, the proposed methodology can be further expanded (as already mentioned above) to determinations of separation distances (ranging) with the use of a short-pulse laser source and a gated optical detector, and/or by exploiting time-of-flight interferometry. In one example, a femtosecond Ti:Sapphire laser source was employed in a time-of-flight (ToF) interferometric setup to effectuate ranging measurements. The implemented system had a sub-micron resolution (of ranging), which—when the S-band frequency scale is taken into account —corresponds to (is comparable with or substantially equivalent to) a centimeter-range resolution achievable during a hypothetical measurement of the actual object in the RF portion of the EM spectrum. The discussed below setup additionally provided the advantage of enabling the image-based reconstruction of a 3D object, probed/interrogated by the electromagnetic wave, from the stack or sequence of 2D images of such object.

As is well known in related art, radar and/or lidar-based ranging measurements are usually performed with the use of a time-of-flight arrangements and high speed electronics. In an appropriately-chosen system, a pulse of energy is emitted by the energy source, scattered by an object, and the back-reflected part of the signal is detected by the receiver. The distance to the object is computed based at least in part on the time (lapsed between the moments of emission and reception of energy) divided by the speed of propagation of the energy in space.

For a typical S-band radar (operating at about 3 GHz frequency and generating 10 ns pulses, see for example, FurunoFR-21355/2165DS system described in "21" Multicolor High-resolution S-BAND RADAR Models FR-21355/2165DS. Tech. Rep., FURUNO ELECTRIC CO., LTD.), the pulse FWHM (full width at half maximum) is about 3 meters, in wavelength terms. It is recognized in related art that that the accuracy of the determination of location of the pulse peak can be at least one-tenth of this value, which gives a range accuracy of about 30 cm for the RF-based system (depending on the exact specification of the system). As discussed below, the accuracy of the determination of the separation distance with the proposed optical technique is at least an order of magnitude better.

If the scaled-down methodology according to the idea of the present invention is used (with a scale factor between about $10^3$ and about $10^6$), a pulse at the wavelength of about 1 micron has a pulse-duration of about 100 fs ($10^{-13}$s), potentially resulting in the ranging accuracy of at least 3 µm. (Notably, in a specific implementation the pulse width (duration) can be increased or decreased with the use of pulse-shaping methods to match the specifications achieved with the use of a particular radar system or an RF band.) Such a short pulse can easily be generated using a mode-locked Ti:Sapphire laser system. However, a photo-detector with a temporal resolution in excess of 100 fs is still under continued development and rather expensive. Therefore, the disclosed below alternative implementation resulting in a micro resolution of the ranging distance does not relay on such photo-detector and utilizes instead, homodyne detection in an interferometric ToF configuration.

Figure 11:
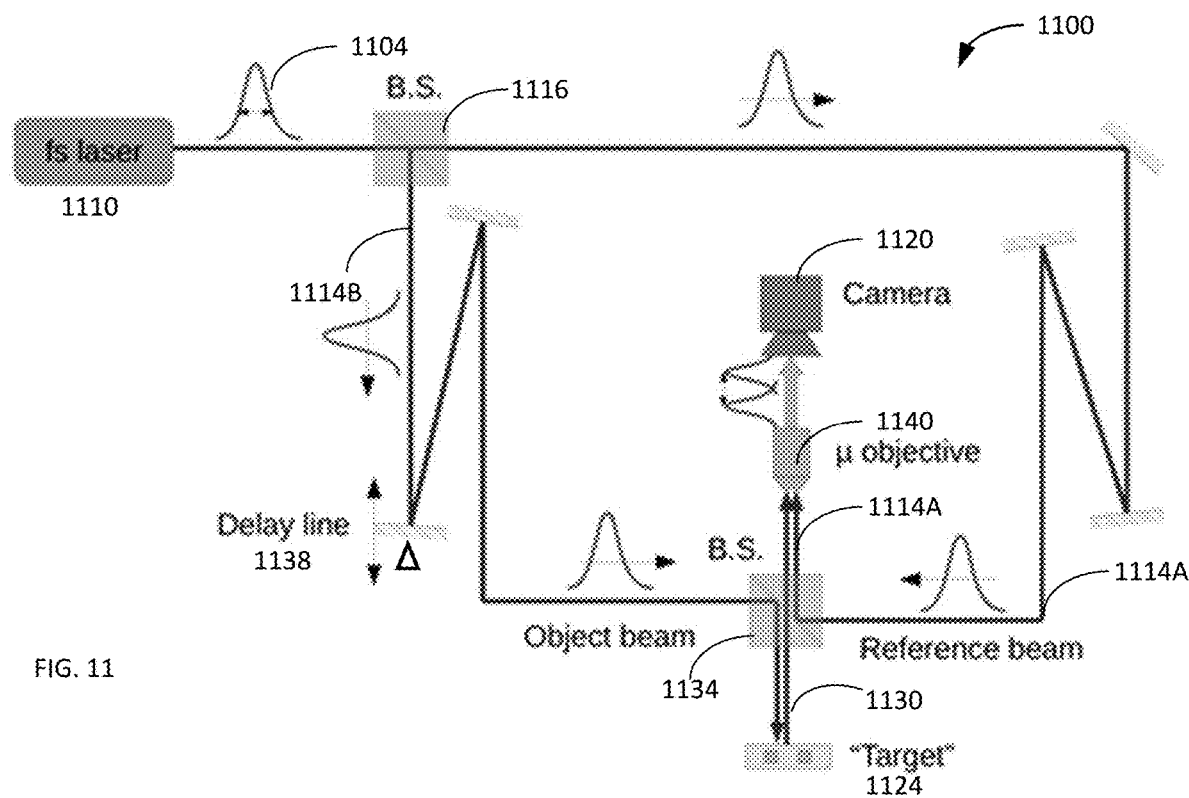
FIG. 11 schematically illustrates an experimental setup configured to implement interferometer-based time-of-flight measurements.

Experimental Setup. An interferometric time-of-flight system, implemented according to an embodiment 1100 of the invention, is presented in FIG. 11. Here, a coherent pulse of light 1104 was emitted by a source 1110 and split into two beams 1114A, 1114B with a non-polarizing beam splitter 1116. The reference beam 1114A was directly detected by a photo-detector 1120, while the object beam 1114B was first sent towards a target 1124 and backscattered to the photo-detector as light 1130. Reference and object beams 1114A, 1114B were coherently combined by another non-polarizing beam-splitter 1134 in a Mach-Zehnder interferometer configuration.

In such a system, interference of the optical beams 1114B, 1130 can only be achieved if both spatial and temporal superpositions of the pulses in such beams take place. To account for the optical path difference between the two corresponding pulses in beams 1114B, 1134, the delay line 1138 was judiciously positioned in one arm of the interferometer (in the arm transmitting the object beam 1114A, in this example). By lengthening or shortening the propagation time via the delay line 1138, the light from the interference between light pulses of the reference beam 1114B with those of the (delayed and back-scattered by different sections of the target 1124) object beam 1114B was ensured.

Instead of a single cell photo-detector 9 conventionally used in the RF-based measurements employed by related art), the detector 1120 was configured as a 2D array optical detector and part of a video camera to record the spatial extent of the interference pattern resulting from the interference of beams 1114B, 1130. Since the target has been reduced by a factor $10^5$ to account for the same scaling between the S-band and the IR spectral band, a microscope objective 1140 was used to magnify/expand the field of view (FOV).

Autocoffelation. The alignment and characterization of the setup 1100 was carried out with the use of a flat mirror located, instead of the target 1124, at the position of the target 1124 and an autocorrelation measurement. During such measurement, schematically illustrated in FIGS. 12A, 12B, 12C, the pulse of light in the beam 1104 interferes with itself, and the fringe visibility at the detector 1120 (that is, the degree of modulation of intensity between constructive and destructive interference) reaches the maximum when the optical path delay A between the beams 1130, 1114B is adjusted to result in a relative pulse delay of zero. When the path delay is increase, the fringe visibility is reduced according to the convolution of the pulse temporal profile with itself. This behavior is presented in FIG. 12C, where the empirical results of the measurement have been interpolated with a Gaussian function (having a FWHM of 30 μm) and is shown with the curve 1210. The determined pulse width value of about 30 microns matched the specification of the laser system 1110, known to delivers 100 fs pulses, thereby confirming the proper and accurate operation of the embodiment 1100. The position of the maximum of the pulse 1210 is defined with a precision of +0.27 μm, which therefore identifies the range accuracy of the system 1100.

Target: Model. The interferometric time-of-flight system 1100 was tested with a simple target made of an idealized ship structure. This structure was composed of a large rectilinear block representing the hull of the actual ship, topped with two smaller rectilinear blocks representing two masts, and was dimensioned as shown in FIG. 13A. The structure dimensions were chosen to correspond to a 100 meter long ship, scaled by a factor $10^5$. This idealized ship model of FIG. 13A was micro-machined with a CNC mill out of aluminum. The photographic representation of the resulting model 1310, recorded in incoherent white light, is shown in FIG. 13B. Visible are marks left by the manufacturing tool on the side of the different elements of the model 1310, as well as a reflection from the substrate due to the grazing incidence of light.

FIG. 13C presents the image recorded by the camera 1120 of the setup 1100 when the idealized ship structure 1310, used as a target 1124, was illuminated with light emitted by the Ti:Sapphire laser 1110 (with the object beam 1114B only, that is without the reference beam 1114A and in absence of interference between the beams 1130, 1114B). Speckle is visible that was caused by the relatively long coherence length of the laser light 1104.

TABLE 1

Fit parameters for the double Gaussian interpolating the data of FIG. 13i.

| PARAMETERS | FIRST GAUSSIAN | SECOND GAUSSIAN |
| --- | --- | --- |
| Peak amplitude (A.U.): | A = 3.45E+07 ± 3.6E+05 | B = 1.02E+07 ± 3.6E+05 |
| Peak locations (μm): | $xC_1$ = 451.95 ± 0.13 | $xC_2$ = 527.03 ± 0.48 |
| FWHM (μm): | w1 = 29.9 ± 0.3 | w2 = 30.4 ± 1.0 |
| Offset (A.U.): | y0 = 3.12E+05 ± 3.4E+03 | |

When the reference beam 1114A is also "turned on" to irradiate the target 1124, 1310, the level of background light increases, as evidenced by the image of FIG. 13D. As a result of changing the beam path delay A with the delay line 1138, the conditions are created when interferometric fringes can be observed on the hull part of the model (FIG. 13E) or the mast sections (FIG. 13F). The examples of images of FIGS. 13E, 13F were taken from a set of multiple images acquired while the path delay A was increased with increments of about 5 microns. As shown in FIGS. 13E, 13F, the background light caused by the presence of the reference beam 1114A makes the interference fringes difficult to discern from the rest of the image of the structure 1310. In order to isolate the sought-after interference pattern, the images were processed by defining a difference between the imaged of FIGS. 13E, 13F and that of FIG. 13C, obtained in absence of light interference between the reference and object beams. The results are presented in FIGS. 13G, 13H, respectively.

Using the set of images where the background has been subtracted, the resulting intensity of the signal was calculated as the sum of the values of intensity recorded at every pixel of the 2D detector 1120. Such analysis methodology was found to be particularly useful, since the results produced by it could be compared to the signal retrieved from a vector network analyzer (VNA) to undoubtedly validate the present interferometric ToF technique. FIG. 13i is a plot of the signal intensity drawn as a function of the beam path delay A. The curve 1320 resulted from an interpolation of the empirically-acquired data (shown by dots) with the function defined by the sum of two Gaussian functions as expressed in Eq. (1) below and with parameters summarized in Table 1.

$$y = y_0 + A \frac{\sqrt{2/\pi}}{w_1} \exp\left\{-2\left(\frac{x - xC_1}{w_1}\right)^2\right\} + B \frac{\sqrt{2/\pi}}{w_2} \exp\left\{-2\left(\frac{x - xC_2}{w_2}\right)^2\right\} \quad (1)$$

The ratio of the values of intensities of the two peaks of the curve 1320 is equal to the ratio of the areas of surfaces of the different elements of the target 1310. The area of the hull is 0.2 mm$^2$, while the masts have a combined surface area of 0.06 mm$^2$, thereby defining such ratio to be 3.33. The measured ratio of the values of the peaks of the curve 1320 is 3.45/1.02=3.38, with the difference of 0.05 falling within the experimental error.

More Realistic Target. In order to test the embodiment of the invention with a more realistic model, a replica of the USS Arizona (BB-39) was built with the use of a 3D CAD file available in the public domain. The replica was 3D printed with a scale-down factor of 100,000. (See FIGS. 5A through 5D). The entire structure was coated with gold to reproduce the high reflectivity of steel in the radio frequency domain at near IR wavelength (>97%).

Multiple (specifically, 118) interferometric images of the model of FIG. 5A were taken with the setup 1100, each image acquisition corresponding to a delay-distance A being monotonically changed by 5 microns. The images were processed in a fashion similar to that discussed in reference to FIGS. 13A through 13H to cancel the background. The stack of images was then imported into the image processing software known as 3D slicer to generate a 3D reconstructed imaged model. The results are presented in FIGS. 14A, 14B, 14C, 14D, where the original CAD model of the ship (FIGS. 14A, 14B) and the corresponding images (FIGS. 14C, 14D) reconstructed based on the ranging measurements with the use of the interferometric ToF setup 1100 are presented side by side in two different orientations. In other words, a person of ordinary skill in the art readily appreciates that, based on the ToF measurements transposed from the RF domain to the optical domain and in accord with the idea of the invention, a tangible representation of topology of the real object can be devised by generating an image representing the ranging measurements of irradiance performed according to the ToF methodology.

Figures 14A, 14B, 14C, 14D:
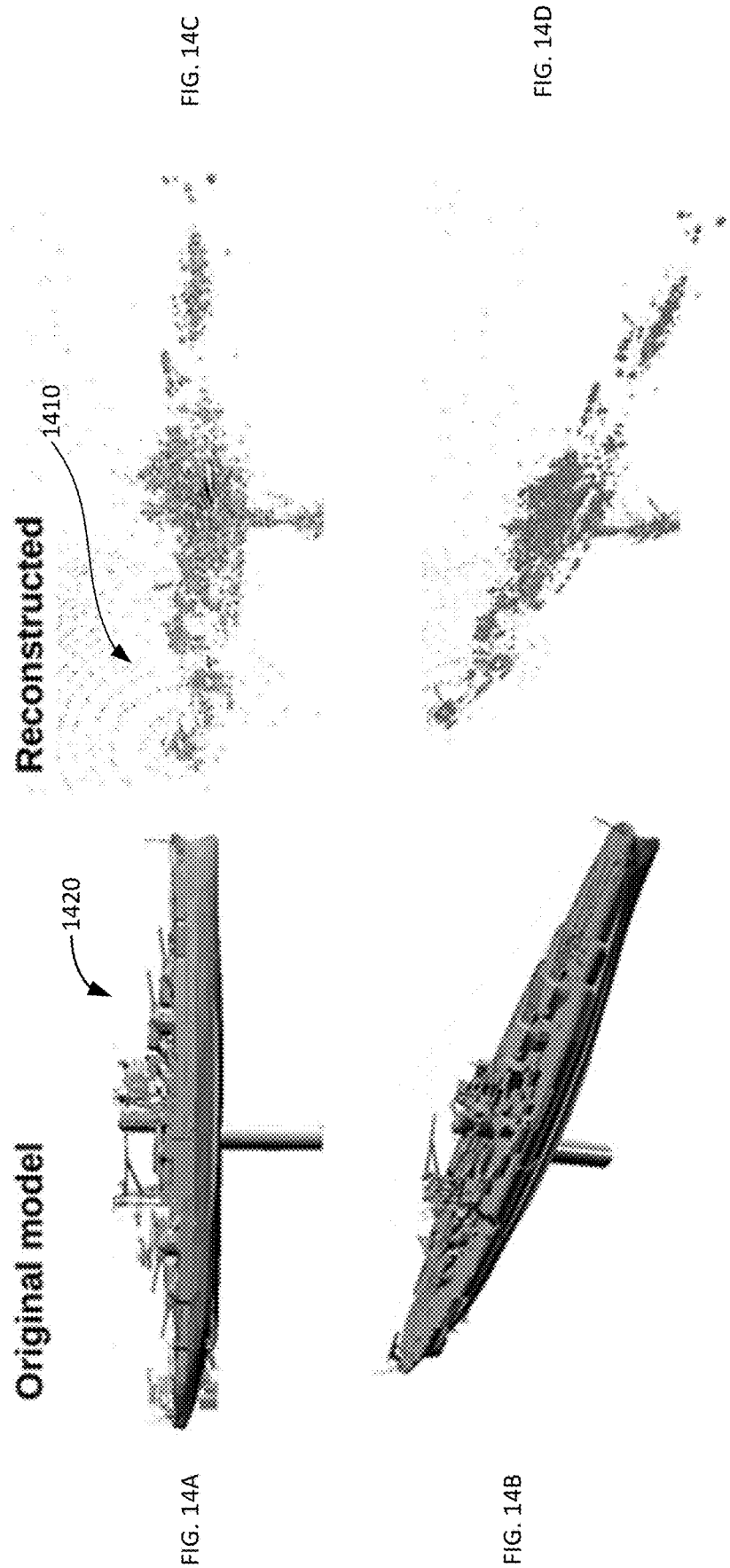
FIGS. 14A, 14B, 14C, and 14D provide illustrations to a 3D model of the USS Arizona.

There are different types of noises and artifacts present in the reconstructed models of FIGS. 14C, 14D: in addition to some scattered signal (showing in the form of "rings" 1410 "emanating" from strongly reflective elements of the structure 1420), several image regions are obscured and remain substantially not visible either due to shadowing effect(s) caused by other elements of the model 1420, or because the reflectivity of such regions of the model 1420 is below the detection threshold. It is appreciated that such imaging artifacts are not unique and/or specific to the operation of the proposed embodiment of the invention, and, as a person of skill in the art will appreciate, are also expected to be observed while using a conventional RF radar system. The latter serves as evidence and confirmation that optical interferometric time-of-flight based RCS measurement can be successfully used to reproduce and replace the ranging capability of an actual RF-based radar system with a setup that easily fits on a tabletop.

In the embodiment 1100, the ranging accuracy was determined to be 0.3 which corresponds to the accuracy of 3 cm in the s-band at operational frequency of 3 GHz. This impressive measurement accuracy depends on the pulse width produce by the chosen source of radiation (element 1110 of FIG. 11; 100 fs corresponds to 30 microns), and can be increased or decreased as a result of laser-pulse shaping to match the specifications of a particular RF-radar system or a particular RF-band of interest. As was already alluded to above, the use of the areal 2D detector in the optical system of the invention results in operational advantage of much higher angular resolution (bearing) than that of a rotating RF-radar system. This resolution can easily be downgraded, if so preferred, by "combining" the processing of optical data acquired from the several detector pixels, up to the entire frame if so desired, to simulate the signal that should be received by a specific radar equipment.

Example 5

To extend the capabilities of the proposed methodology to achieve fuller understanding of radar signatures of structurally-complex target EM structures, the phase characteristics of such target structures has to be assessed. Radar systems, including SAR and ISAR, can retrieve phase of scattered light in the returned RF signal. This is possible in the RF regime because the employed electronic circuits are capable of operating at high enough speed to measure the phase delay. In the optical regime (which is used, according to the idea of the invention, instead of the RF regime) however, the signal frequency is to too high to be able to extract the phase (of the optical signal returned by the target) directly using electronics. Instead, an embodiment of the invention is configured to retrieve phase information using approaches sometimes applied in optical metrology and microscopy applications. As a result of incorporation an optical interferometer in an embodiment of the measurement system of the invention, it becomes possible to construct an "RF emulator" in the optical regime, which is configured to retrieve and map the phase information characterizing the target structure.

Figure 15:
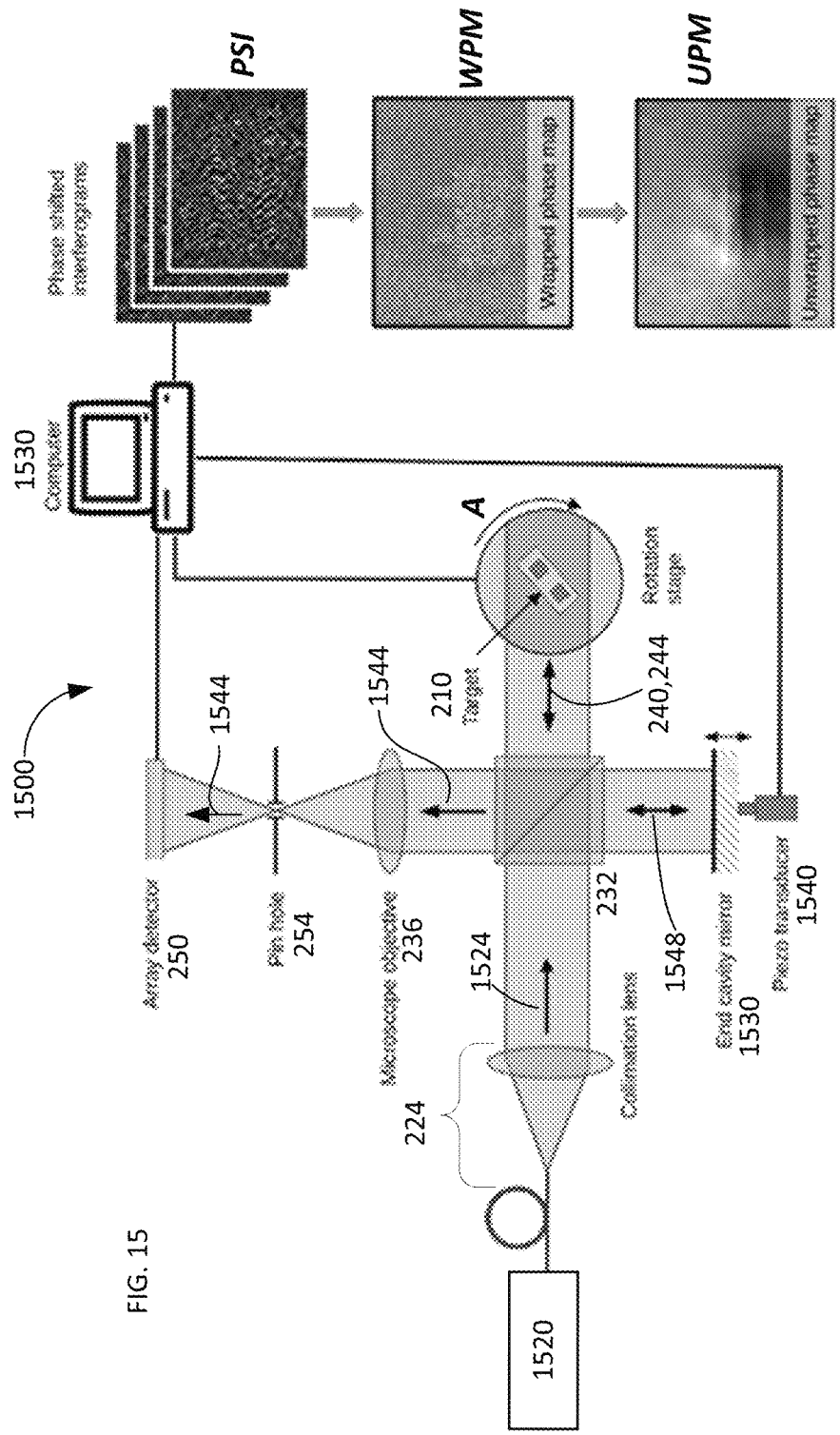
FIG. 15 schematically illustrates an interferometer-based optical system for direct measurement of phase of a signal.

To this end, to retrieve the phase from the optical signal scattered by the target structure (here—the scaled-down model of the actual object), the measurement system employing an interferometer (as shown in FIG. 15—the Twyman-Green interferometer) was used. A plane reference beam interferes with the object beam at the detector location, and a moving end cavity mirror was used to image multiple interferograms with phase shifts.

Light output from the 1064 nm laser source 1520 (operating, depending on the specific measurement, in either a CW mode or a pulsed mode) was spatially expanded and collimated from a fiber output, with the use of the collimator module 224. A 1.064 μm wavelength approximately corresponds to a 100,000-scale factor of a 3 GHz (central s-band) radar signal. A 50/50 beam splitter (BS) 232 was used to divide the collimated beam 1524 between the reference and object arm of the interferometer.

The reference arm of the interferometer was defined by a reflector 1530 configured to be spatially-repositionable (as shown—with the se of the transducer 1540). The target model 210 was placed in the reference arm and imaged (in a light beam 1544 representing spatially-overlapped object beam, 244 returned to the BS 232 by the target 210, and reference beam 1548, returned to the BS 232 by the reflector 1530) using the microscope objective 235 and a 2D CCD array 250. The target 210 was aligned to the illumination beam and the imaging system using a 6-axis stage. A computer-controlled rotation stage was used to set the azimuth angle and allows for an automated sweeping and phase mapping at a set elevation.

A 2-mm pinhole 254 was disposed substantially at the focal plane of the objective 236 to ensure that only on-axis light was imaged by the detector, thereby blocking/removing ant stray light from each of interferograms acquired at the detector 250. A set of phase-shifted with respect to one another interferograms PS were recorded with the use of the programmable processor (electronic circuitry, or PC) 1530. The required phase shift between sequential interferograms PSI was generated by repositioning the reflector 1530 with a piezoelectric transducer (PZT) 1540 to change the optical path length of the reference beam by $\lambda/4$ (although in related embodiments a different, smaller phase-shift increment can be used). The use of phase-shifting as applied to optical interferometry is commonly used in the art, and for that reason is not discussed here in any detail.

In reference to FIGS. 16A, 16B, 16C, and 16C, the initial scaled-down model tested, seen in FIG. 16A as 1600, is gold coated and has a simple geometry of three rectangular boxes representing a highly simplified hull and smokestacks of a ship (compare with that of FIG. 13A). The length of the structure was about 1 mm (corresponding to an actual 100 m ship scaled by a factor of 100,000).

In order to retrieve the phase, at least four interferograms with phase shifts are required. FIGS. 16B, 16C, and 16D show, respectively, a single interferogram, a retrieved phase map without phase unwrapping (corresponding to the phase map WPM of FIG. 15), and a phase map with phase unwrapping (corresponding to the unwrapped phase map UPM of FIG. 15). A Normalization and Orthogonalization Phase-Shifting Algorithm (NOPSA) was used to extract a phase map (see Li. J. et al., in Sci. Reports 7, DOI: 10.1038/srep44307, 2017; incorporated herein by reference). The modulo 27 in the extracted phase distribution WPS (FIG. 16C) can be removed—if desired—using any phase unwrapping algorithm, for example with the use of a Fast-Fourier Transform Phase Unwrapping approach by Schofield et al. (Optics Letters, 28(14), 1194-1196, 2003; incorporated herein by reference) to arrive at the unwrapped phase distribution representing the topology of the target. Generally, phase unwrapping is known as a technique that is often used for post-processing of recovered interferograms, phaseogram, and wrapped signals (the phases of which lay in the interval [~π, π]) in a variety of fields including medical imaging techniques such as magnetic resonance imaging[1] and interference-based microscopy [2], topology surveying including interferometry synthetic aperture radar (InSAR) images, and image reconstruction with fringe projection profilometry [4],[5] where the imaging system/technique inevitably produced a wrapped signals.

Highly scattered light from the model 210 and other unwanted artifacts from the optical system 1500 create significant noise in the extracted phase map. Much of this noise can be cleaned up by masking low quality pixels in the phase map. Low quality pixels are determined by taking the variance of the gradient of the phase and either applying a binary mask to the extracted phase map to remove noisy phase pixels or using a weighted phase map in the unwrapping process.

The "mirror images" seen in the phase maps of FIGS. 16C, 16D are due to reflections of the model 1600 from the substrate which is also coated with gold. (These reflections are not artifacts but are consistent with reflection by sea water in the case of a real ship; see discussion in Example 3). A person of ordinary skill in the art will readily recognize that the result of unwrapping the spatial phase distribution of light (that has been scattered by the scaled-down version of the real object, which phase distribution was acquired with the use of an embodiment of the invention in the optical domain) provides emulation of topology of the real object (by emulating the RF phase information). These results illustrate how successful this method is for generating complex phase maps for micron scale models. Components and features of the real-scale objects that could be detected with RF radar systems can be identified using the proposed technique, which makes this methodology a valuable tool for the process of design of complex structures that need to have well-defined and understood radar signatures.

This initial experiment demonstrates the validity of the proposed experimental technique of transposition of the measurements from the RF regime to the optical regime to emulate the RF phase information.

Figure 17A:
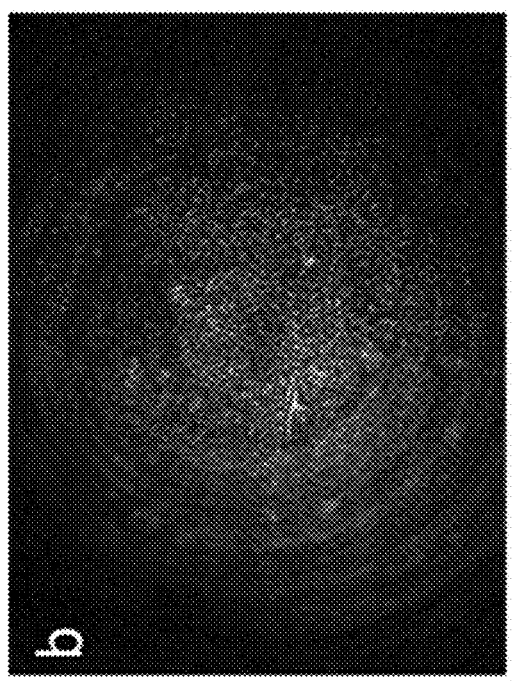
FIG. 17A illustrates an SEM image of the scaled-down model of the USS Arizona.
Figure 17B:
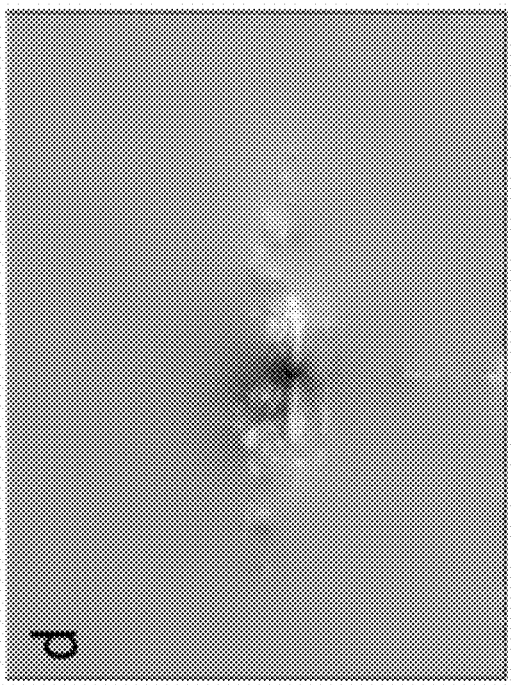
Figure 17C:
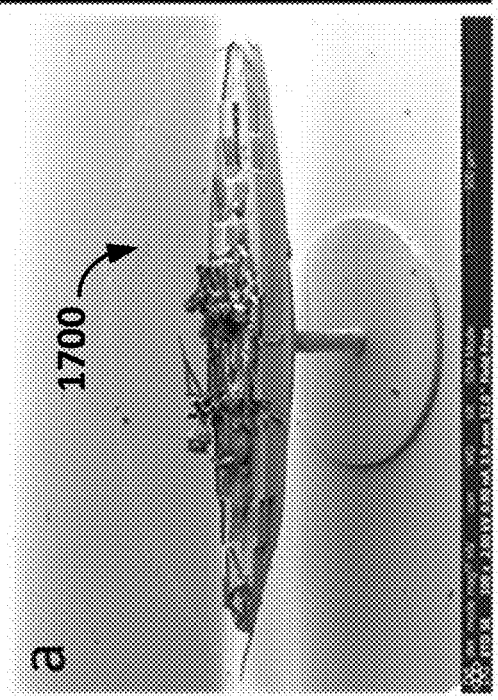
FIG. 17C shows the wrapped phase map and FIG. 17D presents the unwrapped phase map, accordingly.
Figure 17D:
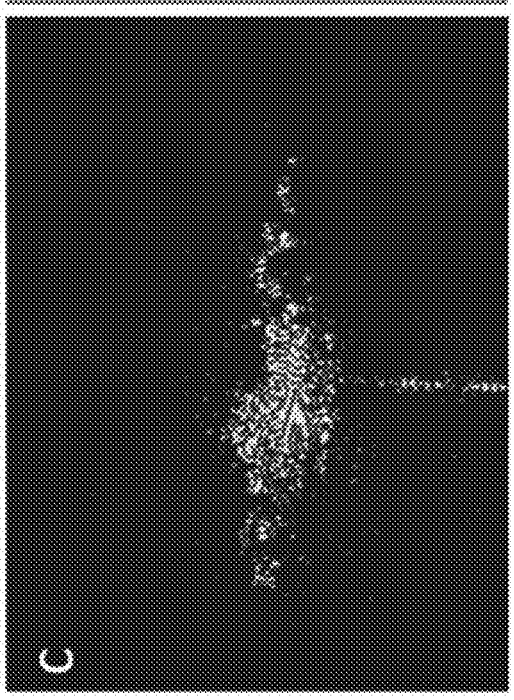

The proposed optical-interferometry-based approach of determining the spatial distribution of phase of the signal returned by the target can be used to emulate much more complex EM systems that cannot easily be simulated computationally. The same approach was used on a 100,000-scale model of the USS Arizona battleship using a 3D CAD file from the public domain. An SEM image of the scaled-down model of USS Arizona (used as a target 210 in the configuration of the embodiment 1500) and corresponding experimental results are presented in FIGS. 17A, 17B, 17C, and 17D. The structure 1700 of FIG. 17A was fabricated using a Photonic Professional GT 3D two-photon lithography printer from Nanoscribe GmbH. The model was printed in negative tone photoresist (IP-S by Nanoscribe). (The resolution of the used nano 3D printer is 150 nm which corresponds to details of 15 mm ($\lambda/6$) in size at the real object. Understandably, then, the analyzed volume is about 3.6e8 $\lambda^3$, which makes this system extremely difficult to analyze using computer simulation.) Finally, the model 1700 was coated with gold using a magnetron sputtering chamber to increase the reflectivity at 1 µm. This coating emulates the reflectivity of a conductor (steel) at radio frequencies. By holding the model 1700 on a stem, the reflection from the substrate was avoided.

Due to the complexity of the geometry of the USS Arizona model 1700, some of the backscattered light 244 may have fallen outside of the field of view of the imaging optics 236. While this may result in what appears to be incomplete phase maps, such maps are representative of what would be measured by an actual radar system, as determined in as we determined with the previous time-of-flight system (see Blanche et al., in Sci. Reports 8, DOI: 10.1038/s41598-017-18131-1,2018; incorporated herein by reference). Of the scattered light 244 imaged by the camera 150, the hull of the ship generates the strongest component to the phase map. Smaller features such as individual gun barrels can also be identified in the phase maps thanks to our robust phase retrieval algorithm.

Figures 18A, 18B:
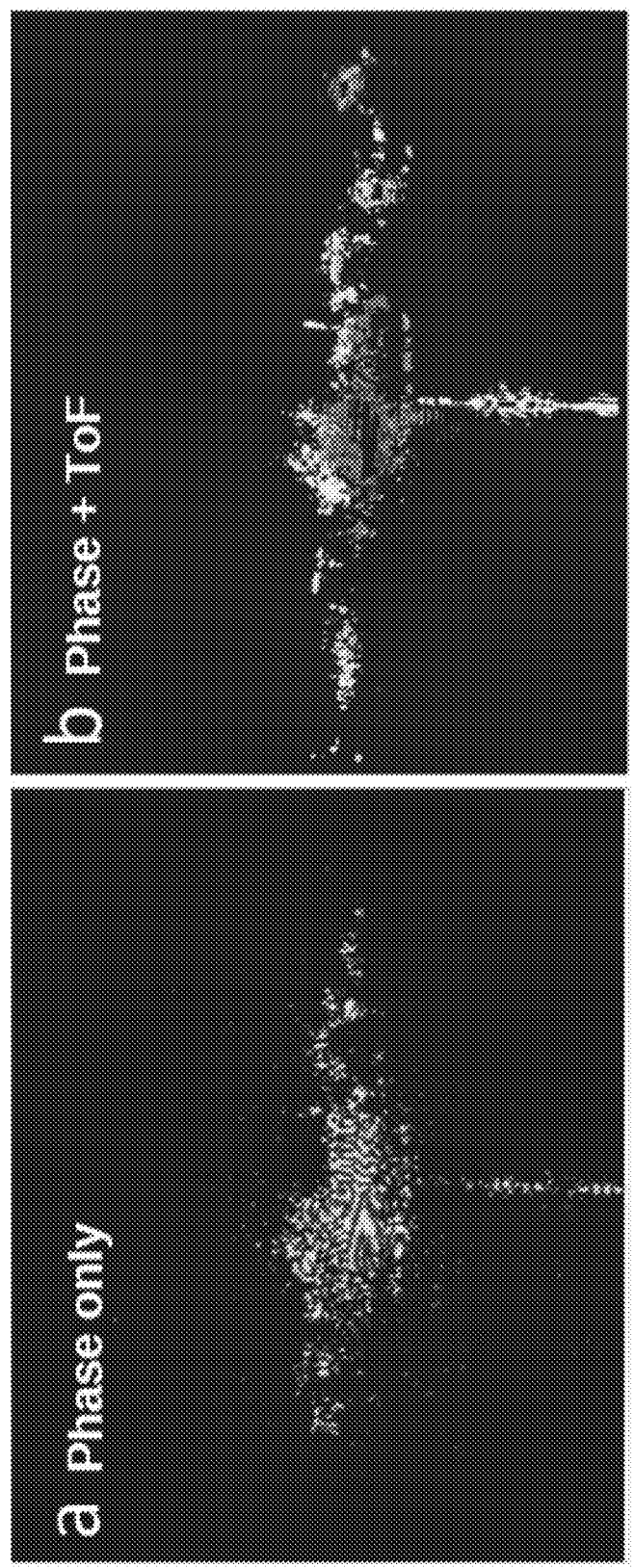
FIG. 18A represents the wrapped phase map of FIG. 17C (obtained with phase-shift interferometrical measurement)
FIG. 18B illustrates the map of FIG. 18A modified with ToF data to resolve spatial discontinuities and increase accuracy of phase determination.

Notably, to the degree that due to the modulo $2\pi$—based artifacts result from the phase retrieval, the system 1500 does not necessarily resolve phase discontinuities of over $2\pi$: the distance separatip two portions of the scaled-down mode, 210 may not be necessarily immediately identified using the unwrapped phase map. However, as discussed above, the time of flight (ToF) technique for a scaled radar range system is capable of measuring precise distances on the order of 0.3 µm with light at a wavelength of about 1 µm (which corresponds to 3 cm when scaled to 3 GHz). By coupling the above-discussed ToF technique with the direct phase measurements presented in this Example 5, the phase discontinuities in the phase map can be resolved. The ToF measurements act as a coarse measurement of distance and the direct phase measurements can increase the resolution of the phase measurement performed with the ToF approach. To this end, the composite phase map obtained with the hybrid ToF/phase-shifting-interferometry map is presented in FIG. 18B—as compared with the phase map of FIG. 18A (that reiterates the map of FIG. 17C). In other words, discontinuities in the spatial distribution of the phase of the chosen radiation can be removed by first performing the time-of-flight measurements to determine a distance to the scaled-down model with a first spatial resolution and then measuring the phase with the use of phase-shifting interferometry to generate another image of the spatial distribution of the phase of the chosen radiation with resolution that is higher than the first spatial resolution.

Example 6

In a related example, a scaled-down model of the actual object was equipped/complemented with nanoantenna(e), implanted or attached directly to the model. Such features made the target (scaled down model of the object) "active" in that the antennae reproduce the radiation emitters present at the object, and facilitate the measurement of antenna gain, shadowing, detection range, as well as interference. Such an active scaled-down model of the actual object was useful to characterize and/or optimize the antenna location(s) not only for mobile platform(s) (ship, aircraft, drone), but also for the upcoming introduction of 5G wireless communication systems (for which signal accessibility is important), for example in urban environment.

Figure 10A:
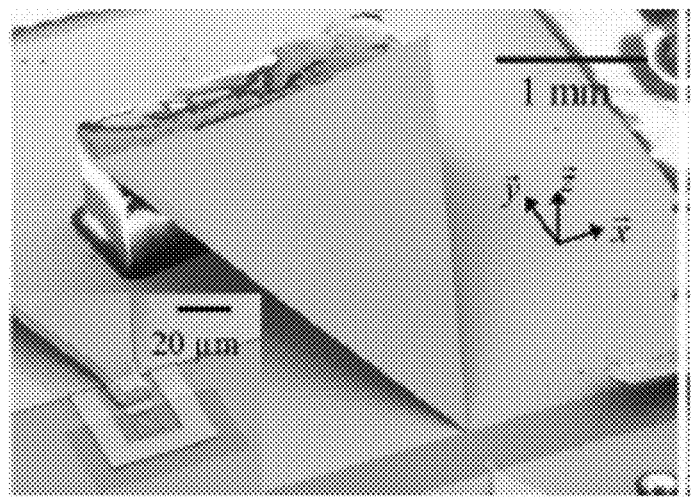
FIGS. 10A, 10B, 10C 10D illustrate plasmonic nanoantenna(e) for use with an embodiment of the invention.
Figure 10B:
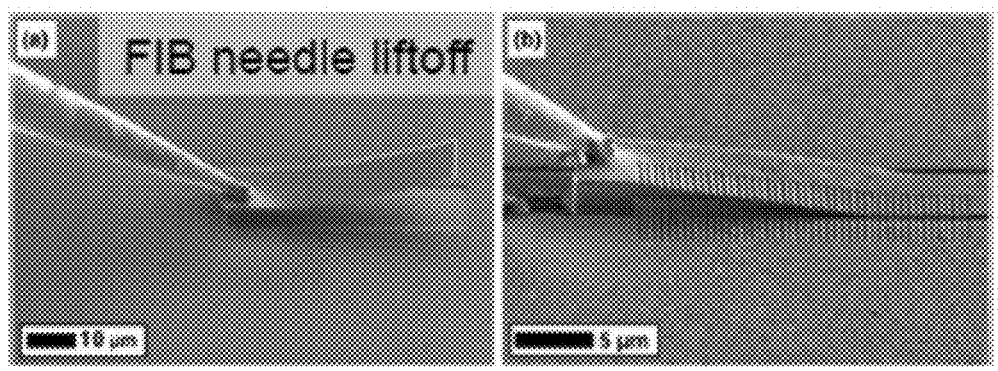
Figure 10C:
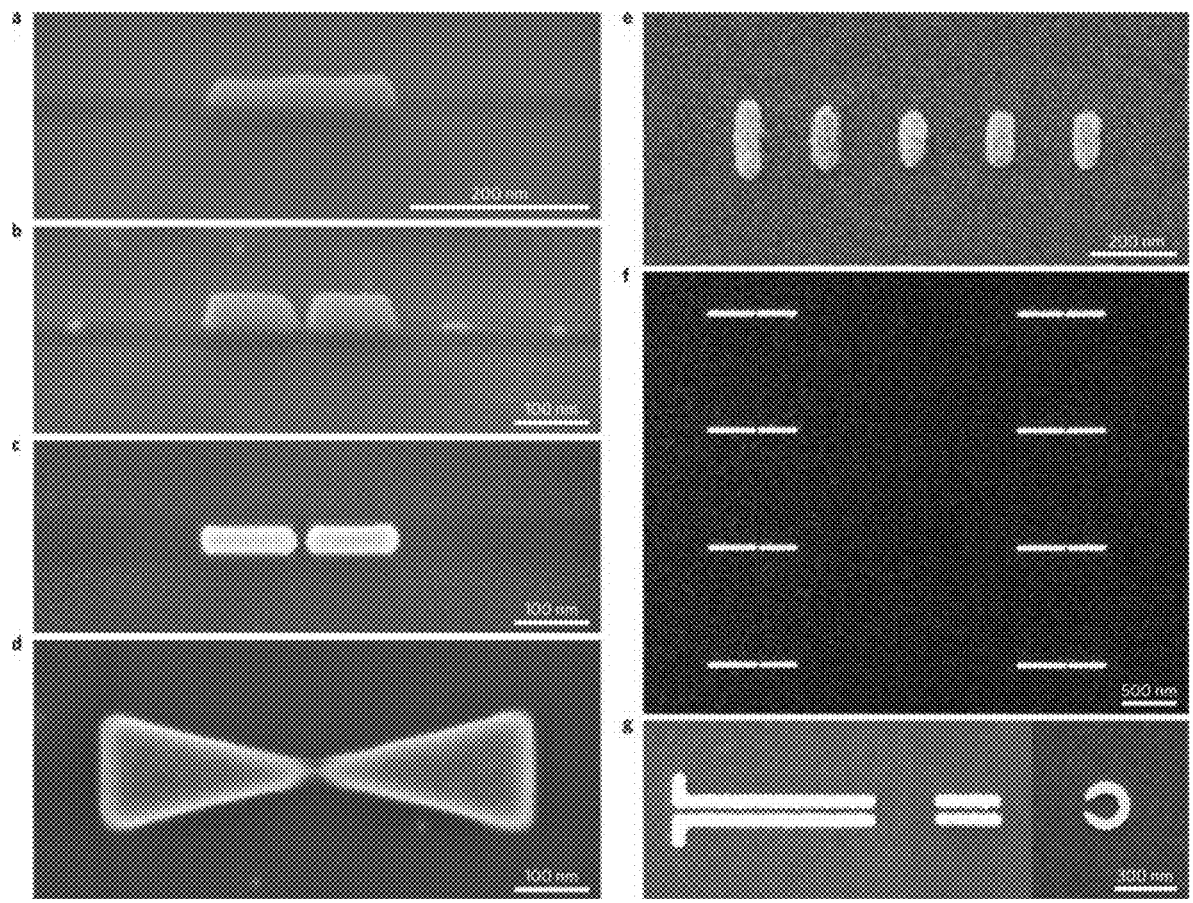
Figure 10D:
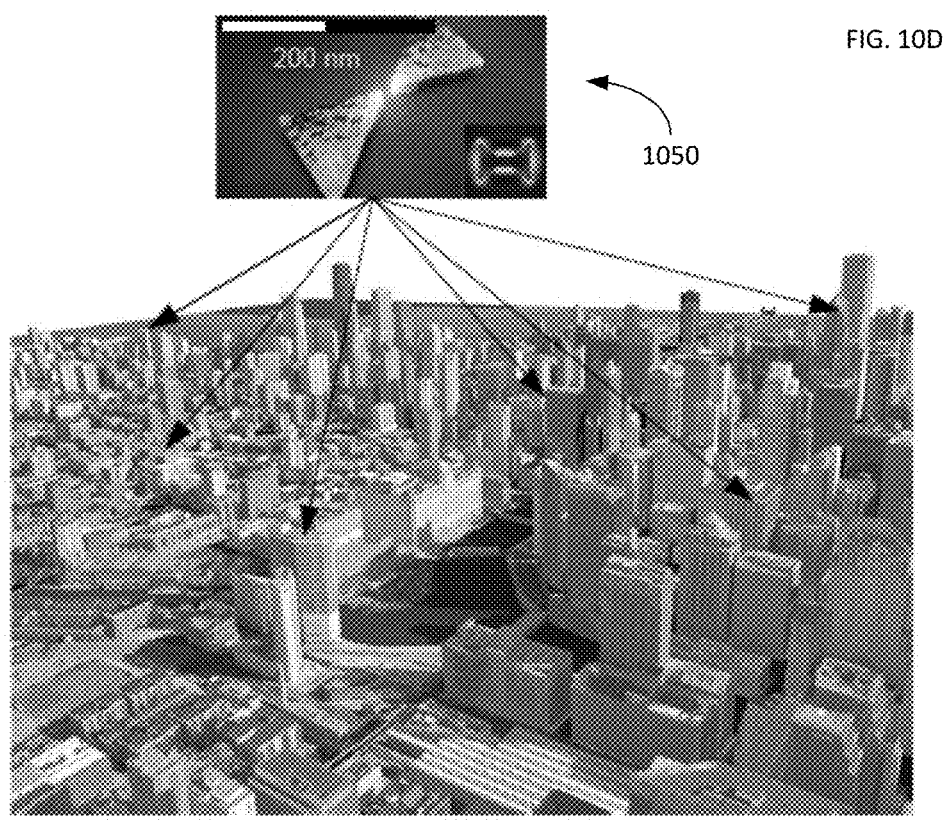

It is appreciated that in a real, field-scale object (such as, for example, a building in a city neighborhood), an antenna on the building represents a source configured to emit radiation. Since in a model of the object, scaled down to dimensions discussed above, it is not possible to stimulate a model of the antenna with an AC current (as would be done with an antenna on a real-scale object) to generate radiation at the appropriate frequency, the model of the antenna (fabricated with the use of, for example, lithographic techniques and affixed to the rest of the model of the object) is used as a nanoantenna, in that it is driven with an optical field. To this end, FIGS. 10A, 10B, and 10C provide SEM images of lithographically-fabricated nano-antennae elements. In particular, FIG. 10B includes two sub-images showing, at different magnifications, the process of lift-off of the antennae element; while FIG. 10C contains seven sub-images illustrating differently-formatted nanoantennae elements. FIG. 10D schematically illustrates the correspondence of the nanoantenna element 1050 to actual antenna associated with a real-scale object (such as a building, in the example of FIG. 10D).

During the optical measurement (emulating the performance of the real-life object at the RF), the nanoantenna of the scaled-down model of the object is illuminated with, for example, a beam of light (such as light 240 of FIG. 2A), this time appropriately focused on the nanoantenna, to cause such nanoantenna emit light at a wavelength different from that of the illuminating light 240. In reference to FIG. 2A, light emitted by the nanoantenna is collected with a 2D optical detector 250 to determine the nanoantenna characteristics based on the output from the optical detector. In addition to this measurement of the nanoantenna characteristics, a complementary measurement of the RCS characteristics may be performed with a spatially-broad beam of light 240 (in a fashion already discussed in reference to FIG. 2A, for example). A skilled artisan will readily appreciate that the so-determined characteristics of the nanoantenna and its performance (such as antenna gain, profile of antenna emission, shadow effects) allow a person of skill to optimize the placement of a real-size antenna on the actual object, for example in order to avoid "shadow zone" of "shadow effects". Stated differently, the characteristics of the nanoantenna of the model of the object and its performance in the optical portion of the spectrum therefore facilitate the determination of the proper placement/orientation of the real-scale RF antenna(e) in/on the actual object.

Notably, according to the idea of the invention, the determination of nanoantenna characteristics in domain discussed above can be practically combined with the measurements of spatial distribution of phase (presented in Example 5) to emulate the phase of an RF signal associated with the antenna of a real object.

It is understood that the term "profile of emission of an antenna" refers to and defines an antenna's emission profile determined in absence of any structure at least partially blocking the antenna with respect to the detector used to acquire such emission. In case some masking element or structure blocks the antenna at least in part, the shadow effect(s) and zone(s) may be observed. The antenna interference effects may require the presence of multiple antennae.

"Scaling" of Materials

Figures 8A, 8B:
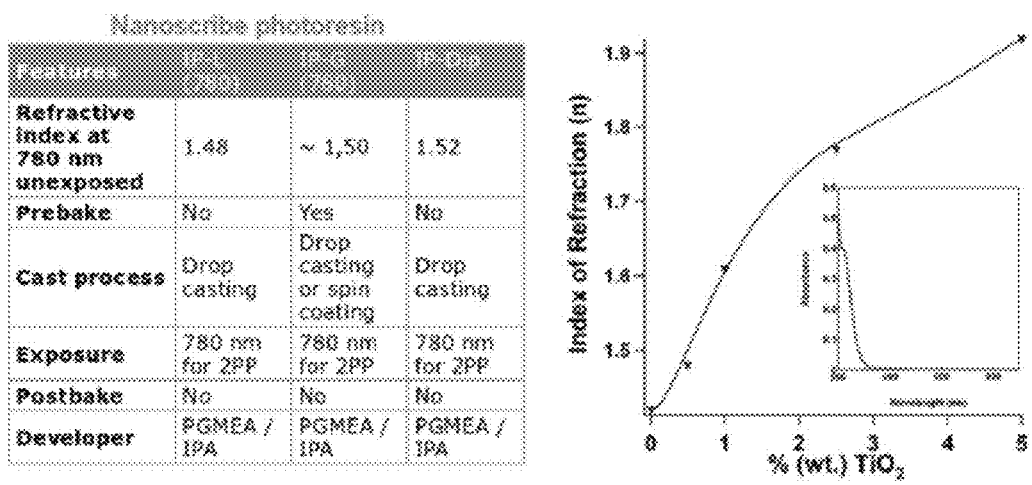
FIGS. 8A, 8B summarize information about some examples of optical materials that can be used for fabrication of scaled-down models of the objects according to an idea of the invention.

Examples of optical materials that can be used for constructions of scaled-down models of objects for optical-domain-measurements of RCS value(s) and that possess characteristic(s) required to implement the idea of the invention are presented in FIG. 8A. Notably, the EM properties of specific materials (such as permittivity, permeability) can be tuned to satisfy specific requirements. As a non-limiting example, in reference to FIG. 8B, the index of refraction of $TiO_2$-nanoparticle-containing silicon composite was shown to change as a function of % (wt) of nanoparticles (see, for example, J. Appl. Phys. 103, 83120, 2008). Accordingly, a 3D printing photoresin, for example, can be loaded with nanoparticles to tune its permittivity. FIG. 9 provides examples of manufacturing processes that can be used, according to the idea of invention, to fabricate the scaled-by-a-factor-of-$10^5$ models of objects.

For the purposes of this disclosure and the appended claims, the use of the terms "substantially", "approximately", "about" and similar terms in reference to a descriptor of a value, element, property or characteristic at hand is intended to emphasize that the value, element, property, or characteristic referred to, while not necessarily being exactly as stated, would nevertheless be considered, for practical purposes, as stated by a person of skill in the art. These terms, as applied to a specified characteristic or quality descriptor means "mostly", "mainly", "considerably", "by and large", "essentially", "to great or significant extent", "largely but not necessarily wholly the same" such as to reasonably denote language of approximation and describe the specified characteristic or descriptor so that its scope would be understood by a person of ordinary skill in the art. The use of these terms in describing a chosen characteristic or concept neither implies nor provides any basis for indefiniteness and for adding a numerical limitation to the specified characteristic or descriptor. As understood by a skilled artisan, the practical deviation of the exact value or characteristic of such value, element, or property from that stated falls and may vary within a numerical range defined by an experimental measurement error that is typical when using a measurement method accepted in the art for such purposes.

An embodiment of the system of the invention includes electronic circuitry (for example, a computer processor) controlled by instructions stored in a memory, to perform governing of the described laser source and/or specific data collection/processing steps. The memory may be random access memory (RAM), read-only memory (ROM), flash memory or any other memory, or combination thereof, suitable for storing control software or other instructions and data. Those skilled in the art would readily appreciate that instructions or programs defining the operation of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement a method of the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

For the purposes of description and claims, the term "optically-conjugate" and related terms are understood as being defined by the principal of optical reversibility (according to which light rays will travel along the originating path if the direction of propagation of light is reversed). Accordingly, these terms, as referring to two surfaces, are defined by two surfaces the points of which are imaged one on to another with a given optical system. If an object is moved to the point occupied by its image, then the moved object's new image will appear at the point where the object originated. The points that span optically-conjugate surfaces are referred to and defined as optically-conjugate points. The term "tangible representation" is defined to include a plot, image, a data array, a spatial map, or another representation of data in question that is perceivable by a human user. The term "spatial map" refers to a user-perceivable expression representing data in question as a function of spatial coordinates.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

What is claimed is:

1. A method for measuring a characteristic, which an object possesses at a first frequency from a radiofrequency (RF) portion of electromagnetic (EM) spectrum, wherein the object is made of a first set of materials, the method comprising:
from a second set of second materials, fabricating a scaled-down model of the object with a scale-reduction factor N in a range from about $10^3$ to about $10^6$,
wherein a chosen EM property of a material from the first set has a first value at the first frequency from the RF-portion of the EM spectrum,
wherein the chosen EM property of a respectively-corresponding material from the second set of materials has a second value at a second frequency,
wherein the second frequency is substantially equal to the first frequency multiplied by said scaled-reduction factor N,
and
wherein the first value and the second value are substantially equal,
irradiating said scaled-down model along an axis with chosen radiation that has a frequency spectrum including the second frequency;
forming a tangible representation of a dependence of a value, of a RF radar cross-section (RCS) of the object at the first frequency, on a parameter representing spatial orientation of said object by acquiring, with a radiation detector, the chosen radiation that has been scattered by the scaled-down model; and
producing a tangible representation of topology of the object by generating at least one of a first image of a spatial distribution of a phase of the chosen radiation that has been scattered by the scaled-down model and a second image of spatial distribution of irradiance of said chosen radiation performed with the use of time-of-flight measurements.

2. The method according to claim 1, further comprising:
forming a two-dimensional radiative image of said scaled-down model in an image plane that is optically-conjugate with the scaled-down model; and
identifying a structural element of the object that exhibits a chosen value of the RCS at the first frequency by establishing a one-to-one correspondence between features of said radiative image and features of the tangible representation.

3. The method according to claim 1, wherein at least one of
a) said producing the tangible representation of the topology of the object, and
b) said forming the tangible representation of said dependence includes collecting the chosen radiation through a pin-hole element disposed across a beam of the chosen radiation to prevent a portion of the chosen radiation propagating off said axis from irradiating the model.

4. The method according to claim 1, wherein the frequency spectrum of said chosen radiation does not include any of a third frequency from the RF portion of EM spectrum and a fourth frequency from a THz frequency range.

5. The method according to claim 4, wherein the third frequency is equal to the first frequency.

6. The method according to claim 1, wherein said chosen radiation includes only radiation with a wavelength shorter than 100 microns.

7. The method according to claim 1, wherein said chosen radiation includes only radiation with a wavelength within a range from about 350 nm to about 2,500 nm.

8. The method according to claim 1, comprising
spatially overlapping a first portion of said chosen radiation, which has been redirected towards a reflector, with the chosen radiation that has been scattered by the scaled-down model, and
acquiring spatial distribution of the chosen radiation resulting from said spatially overlapping with the radiation detector while discretely repositioning the reflector along an axis transverse to the reflector to shift a phase of said first portion.

9. The method according to claim 1, wherein the fabricating said scaled-down model includes fabricating a nanoantenna representing, with the scale-reduction factor, an antenna of the object, and further comprising:
irradiating said nanoantenna with a focused beam of said chosen radiation, and
acquiring, with the radiation detector, radiation at a fifth frequency that has been emitted by the nanoantenna in response to said irradiating, to form a spatial map of at least one of an emission profile of said antenna of the object in the RF portion of the EM spectrum,
(ii) gain of said antenna of the object in the RF portion of the EM spectrum,
(iii) a parameter representing interference of antennae of the object operating in the RF portion of the EM spectrum, and
(iv) a shadow zone of said antenna of the object in the RF portion of the EM spectrum;
wherein the fifth frequency is different from the second frequency.

10. The method according to claim 9, wherein the acquiring includes acquiring the radiation at said fifth frequency in absence of a pin-hole disposed across a beam of said radiation at the fifth frequency.

11. The method according to claim 9, further comprising:
performing at least one of repositioning and reorientation of said antenna of the object based on said spatial map to achieve at least one of (i) reduction of the interference of the antennae of the object operating in the RF portion of the EM spectrum, and (ii) reduction of the shadow zone of said antenna of the object in the RF portion of the EM spectrum.

12. The method according to claim 1, wherein said forming includes determining said dependence in real time.

13. The method according to claim 1, wherein said forming includes equating the value of the RCS at the first frequency to a value representing a result of integration of readings of irradiance, of the chosen radiation, at all pixels of the radiation detector.

14. The method according to claim 1, wherein said producing includes forming a sequence of optical interferograms produced by with the use of a) the chosen radiation that has been scattered by the scaled-down model disposed in a sample arm of an interferometer, and b) a portion of the chosen radiation that has been reflected in a reference arm of the interferometer while changing a length of the reference arm.

15. The method according to claim 1, wherein said generating the first image of the spatial distribution includes generating an image of said spatial distribution that is devoid of phase discontinuities of $2\pi$ or higher.

16. The method according to claim 1, comprising measuring at least one characteristic of an antenna of the object by
irradiating a nanoantenna of the scaled-down model with a focused beam of the chosen, wherein the nanoantenna represents the antenna of the object; and with the radiation detector, acquiring radiation at a third frequency emitted by the nanoantenna in response to said irradiating.

17. The method according to claim 16, further comprising:
forming a spatial map of at least one of (i) an emission profile of said antenna of the object in the RF portion, (ii) gain of said antenna of the object in the RF portion, (iii) antennae interference of antennae of the object in the RF portion, and (iv) a shadow zone of said antenna of the object in the RF portion.

18. The method according to claim 17, further comprising:
generating a report containing a recommendation about at least one of repositioning and reorientation of said antenna of the object based on said spatial map.

19. The method according to claim 1, comprising:
removing discontinuities in the spatial distribution of the phase of the chosen radiation by first performing the time-of-flight measurements to determine a distance to the scaled-down model with a first spatial resolution and then measuring said phase of the chosen radiation with the use of phase-shifting interferometry to generate a third image of the spatial distribution of the phase of the chosen radiation with resolution that is higher than the first spatial resolution.

\* \* \* \* \*